US012526575B2

(12) United States Patent
Sato

(10) Patent No.: US 12,526,575 B2
(45) Date of Patent: Jan. 13, 2026

(54) IMAGE CAPTURING APPARATUS

(71) Applicant: CANON KABUSHIKI KAISHA, Tokyo (JP)

(72) Inventor: Yasuhiro Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 18/438,660

(22) Filed: Feb. 12, 2024

(65) Prior Publication Data

US 2024/0276144 A1 Aug. 15, 2024

(30) Foreign Application Priority Data

Feb. 15, 2023 (JP) ................................ 2023-021867

(51) Int. Cl.
*H04R 3/00* (2006.01)
*H04R 1/08* (2006.01)

(52) U.S. Cl.
CPC ............... *H04R 3/005* (2013.01); *H04R 1/08* (2013.01); *H04R 2410/05* (2013.01)

(58) Field of Classification Search
CPC ....... H04R 3/005; H04R 1/08; H04R 2410/05
USPC ........................ 381/56, 58, 91, 92, 124, 385
See application file for complete search history.

(56) References Cited

U.S. PATENT DOCUMENTS

| | | | | |
|---|---|---|---|---|
| 8,867,773 | B2 * | 10/2014 | Kimura | H04R 1/086 381/361 |
| 9,363,596 | B2 | 6/2016 | Dusan | |
| 10,061,352 | B1 * | 8/2018 | Trail | G02B 27/0172 |
| 2016/0293051 | A1 * | 10/2016 | Djugash | G09B 21/009 |
| 2018/0077507 | A1 * | 3/2018 | Bernal Castillo | G01H 17/00 |
| 2021/0185229 | A1 * | 6/2021 | Dick | H04R 3/002 |
| 2022/0000229 | A1 * | 1/2022 | Sapir | H04R 1/1041 |

FOREIGN PATENT DOCUMENTS

| | | | |
|---|---|---|---|
| JP | 2009049947 | A | 3/2009 |
| JP | 4931907 | B2 | 5/2012 |
| JP | 2019054440 | A | 4/2019 |

* cited by examiner

*Primary Examiner* — William A Jerez Lora
(74) *Attorney, Agent, or Firm* — Cowan, Liebowitz & Latman, P.C.

(57) ABSTRACT

An image capturing apparatus that can be worn by a user includes an image capturing circuit, a first microphone that is arranged on a right side of the user and obtains environmental sounds, a second microphone that is arranged on a left side of the user and obtains environmental sounds, a third microphone that is arranged in the vicinity of the first microphone and obtains a noise, a fourth microphone that is arranged in the vicinity of the second microphone and obtains a noise, and a sound processing unit configured to generate right-channel and left-channel sound signals obtained by the first and second microphones, and the sound processing unit executes processing for reducing a noise in the right-channel and the left-channel sound signals by using sound signals output from the third and fourth microphones.

7 Claims, 14 Drawing Sheets

IMAGE CAPTURING APPARATUS

BACKGROUND OF THE INVENTION

Field of the Invention

The present invention relates to an image capturing apparatus with a sound pickup function.

Description of the Related Art

Conventionally, in shooting that uses a camera, a photographer needs to keep the camera facing the shooting direction. This causes the photographer to concentrate on manipulating the camera for shooting, and makes it difficult for the photographer to focus on matters other than the act of shooting, thereby preventing the photographer from concentrating their focus on experiences in a shooting environment.

For example, in a case where a parent takes a shot of their child, the parent, who is the photographer, cannot play with their child, and cannot perform shooting if they play with their child. That is to say, it is difficult to perform shooting and gain an experience at the same time. Similarly, also in a case where shooting is performed simultaneously with an activity like a sport, it is difficult to experience the sport simultaneously with the execution of shooting while handholding a camera.

Conventionally, a wearable camera that can be worn on a body has been known. A photographer performs shooting while wearing such a wearable camera; as a result, for example, a parent, who is the photographer, can record images while gaining an experience of playing with their child.

Also, binaural recording has been conventionally known as a method of recording sounds. When a listener hears sounds recorded through binaural recording using stereo headphones and the like, the listener can enjoy sounds with a highly realistic sensation that makes them feel as if they were at the location.

In binaural recording, sounds need to be recorded at positions close to human ears. Conventional binaural recording adopts a sound recording method that uses binaural recording microphones, which are microphones embedded in ear parts of a model that simulates the shape of a human head. When binaural recording microphones in a head-shaped model are used, it is necessary to gain an experience and perform shooting while holding the model; this makes it difficult to concentrate on the experience, similarly to the case of conventional camera shooting.

Therefore, there are cases where binaural recording is performed by fitting, in the ears of a photographer, microphones that can be fit in left and right ears like earphones. Japanese Patent Laid-Open No. 2009-49947 discloses a sound recording apparatus that performs binaural recording using earphones with a noise-cancelling function, whereby noise-cancelling microphones in the left and right earphones are used for recording.

However, when the microphones according to Japanese Patent Laid-Open No. 2009-49947 are used, the ears of the photographer are plugged. As a result, it becomes difficult to hear ambient sounds simultaneously with the execution of sound recording, which is a hindrance to gaining an experience and performing shooting at the same time. By creatively arranging microphones in a camera casing of a small camera that can be worn on a body so as to enable binaural recording, a video that is provided with binaural sounds and offers a highly realistic sensation can be shot.

However, even if the microphones have been arranged creatively in the foregoing manner, when shooting is performed using a small camera worn on a body simultaneously with an experience of an activity, sounds attributed to rustling of clothes near the camera, sounds attributed to vibration transmitted from the body to the casing of the camera, and the like may be input to the microphones as sounds. If these sounds, which are noises, are input to the microphones, a large noise different from the sound that the photographer is hearing is superimposed and recorded, thereby impairing the quality of sounds obtained through binaural recording.

SUMMARY OF THE INVENTION

The present invention has been made in view of the above-described problems, and aims to improve the recording quality of sounds when binaural recording is performed using a camera that can be worn on a body.

According to an aspect of the present invention, there is provided an image capturing apparatus that can be worn by a user hung around a neck of the user, the image capturing apparatus comprising: an annular member that surrounds the neck of the user when the image capturing apparatus is worn on the user; an image capturing circuit; a first microphone that is arranged in the annular member at a position on a right side of the user and obtains environmental sounds; a second microphone that is arranged in the annular member at a position on a left side of the user and obtains environmental sounds; a third microphone that is arranged in the annular member in the vicinity of the first microphone and obtains a noise due to vibration of the image capturing apparatus; a fourth microphone that is arranged in the annular member in the vicinity of the second microphone and obtains a noise due to vibration of the image capturing apparatus; and a CPU; a memory storing a program that, when executed by the CPU, causes the CPU to function as a sound processing unit configured to generate a right-channel sound signal and a left-channel sound signal by using a sound signal obtained by the first microphone and a sound signal obtained by the second microphone, the sound processing unit executing processing for reducing a noise in the right-channel sound signal and a noise in the left-channel sound signal by using a sound signal output from the third microphone and a sound signal output from the fourth microphone, wherein the first microphone and the second microphone are exposed to an outside of the annular member so as to be capable of obtaining environmental sounds, whereas the third microphone and the fourth microphone are covered in the annular member.

Further features of the present invention will become apparent from the following description of exemplary embodiments with reference to the attached drawings.

DESCRIPTION OF THE EMBODIMENTS

Figure 1A:
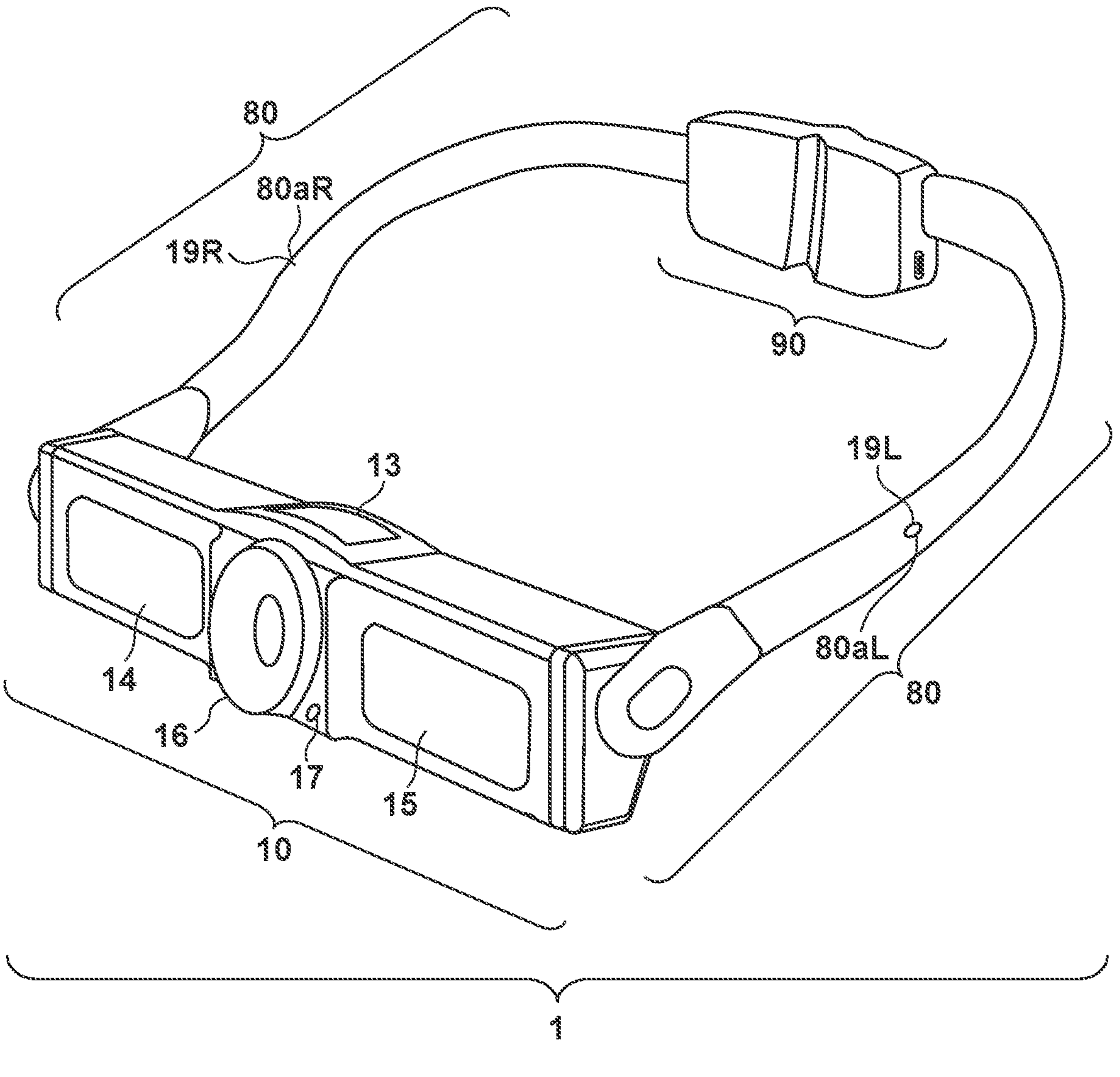
FIG. 1A is an external view of a camera according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1A to FIG. 1D are diagrams for escribing a camera system in a first embodiment of the present invention. The camera system of the present embodiment includes a camera 1, which includes a main body unit 10, and a display apparatus 800 that is configured separately therefrom. Note that although the present embodiment is described using an exemplary case where the camera 1 and the display apparatus 800 are separate entities, they may be configured integrally. Also, a person who is wearing the camera 1 hung around their neck will be hereinafter referred to as a user.

FIG. 1A is an external view of the camera 1 that can be worn by the user around their neck.

In FIG. 1A, the camera 1 includes the main body unit 10, a battery unit 90, and a mount unit 80 that connects between the main body unit 10 and the battery unit 90 (power supply means). The main body unit 10 is configured to include a face direction detection window 13, a start switch 14, a stop switch 15, a photographing lens 16, and an LED 17. Also, the main body unit 10, the mounting unit 80, and the battery unit 90 compose an annular casing. The mount unit 80 is an annular member that connects between the main body unit 10 and the battery unit 90, and also allows the main body unit 10 to be worn on a neck area of the user. When the camera 1 is hung around the user's neck, this annular casing of the camera 1 is placed so as to surround the user's neck.

The face direction detection window 13 is built in the main body unit 10. In order to detect the position of each part of the user's face, the face direction detection window 13 allows infrared light projected from infrared LEDs 22 (see FIG. 5) and reflected light thereof to be transmitted therethrough.

The start switch 14 is a switch for starting shooting. The stop switch 15 is a switch for stopping shooting. The photographing lens 16 directs light rays to be shot to a solid-state image sensor 42 (see FIG. 5) inside the main body unit 10. The LED 17 is used to indicate that shooting is in progress, and to issue a warning.

Microphones 19R and 19L are microphones for obtaining environmental sounds, which are sounds around the camera 1; the microphone 19L takes in sounds on the left surrounding side of the user (the observer's right in FIG. 1A), whereas the microphone 19R takes in sounds on the right surrounding side of the user (the observer's left in FIG. 1A). The microphone 19L and the microphone 19R are each arranged on the mount unit 80, and an outer circumference of the mount unit 80 has openings 80*a*L and 80*a*R for sound pickup, via which the microphone 19L and the microphone 19R are exposed to the outside so that external environmental sounds can be obtained. The microphone 19L and the opening 80*a*L are arranged in the mount unit 80 so that they are located below and in the vicinity of the left ear of the user when the camera 1 is worn on the user's neck. Also, the microphone 19R and the opening 80*a*R are arranged in the mount unit 80 so that they are located below and in the vicinity of the right ear of the user when the camera 1 is worn on the user's neck.

Figure 1B:
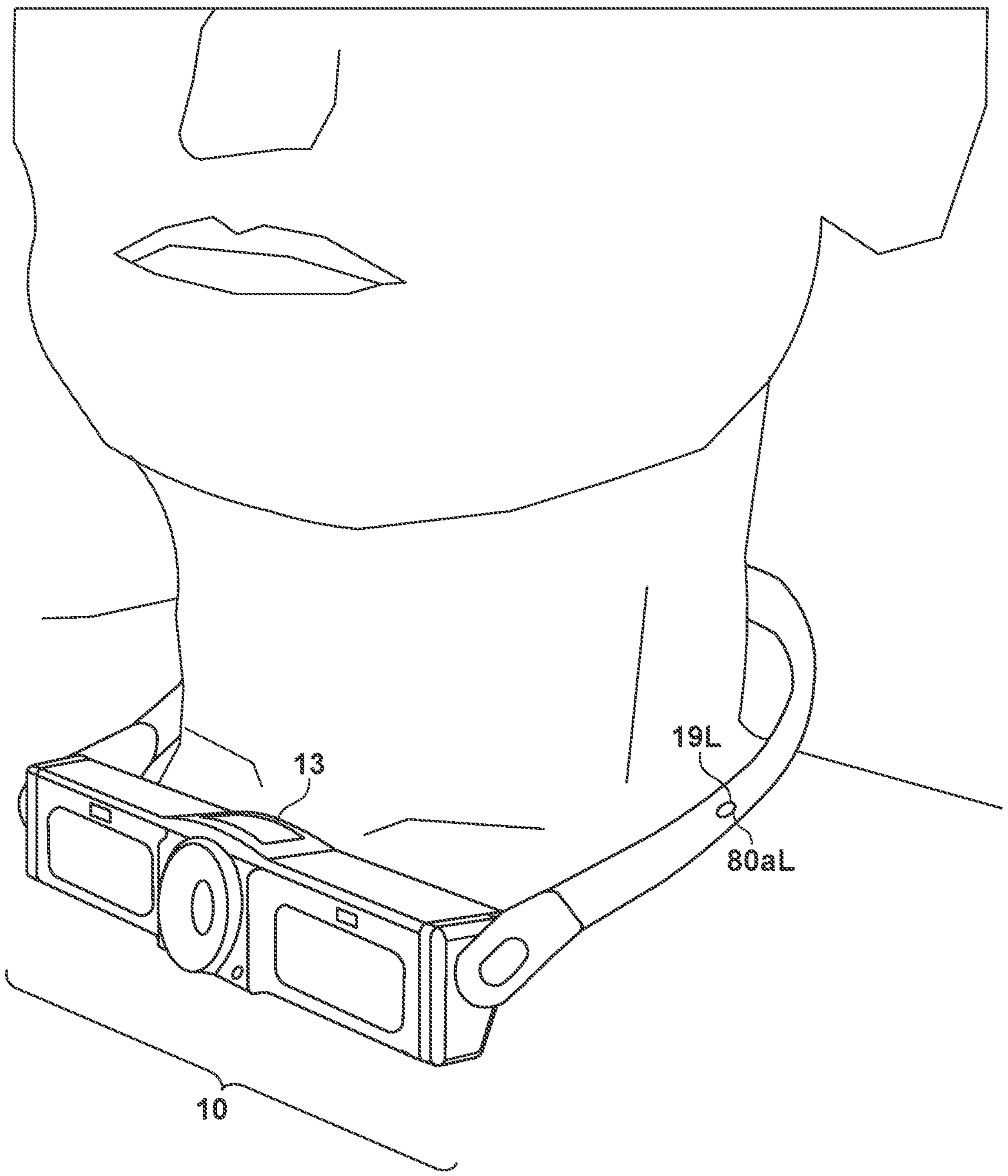
FIG. 1B is a diagram showing a state where the camera is hung around a user's neck.

FIG. 1B is a diagram showing a state where the camera 1 is hung around the user's neck.

In the camera 1, the mount unit 80 and the camera's main body unit 10 are configured so that the user easily wears and takes off the camera 1 using a non-illustrated connection/connection-cancellation mechanism provided on both ends of the camera's main body unit 10. Accordingly, the camera 1 is worn on the neck area of the user, the mount unit 80 being hung around the neck area of the user in a state where the mount unit 80 has been detached from the camera's main body unit 10 by the user, and connecting both ends of the mount unit 80 to both ends of the camera's main body unit 10. The camera 1 is worn so that the battery unit 90 is situated on the back side of the user, and the main body unit 10 is situated on the front side of the user's body. The camera 1 is supported by the mount unit 80, both ends of which are connected to the vicinity of the left and right ends of the main body unit 10, and is pushed in the direction toward the user's chest. Consequently, the main body unit 10 is located approximately in front of the collarbones of the user. At this time, the face direction detection window 13 is located below the user's chin. An infrared light collecting lens 26 shown in FIG. 2E is arranged inside the face direction detection window 13. An optical axis (a detection optical axis) of the infrared light collecting lens 26 extends in a direction different from a direction of an optical axis (an image capturing axis) of the photographing lens 16, and a later-described face direction detection unit 20 can detect the position of each part of the face and determine the observing direction of the user. In this way, a later-described shooting unit 40 can perform shooting in the observing direction of the user. A method of adjusting the set position in accordance with individual differences in the body shape and differences in outfits, etc. will be described later.

Also, arranging the main body unit 10 in front of the body and the battery unit 90 on the back side of the body in the foregoing manner can achieve the advantageous effect of alleviating fatigue of the user through dispersion of weight, and the advantageous effect of suppressing displacement caused by, for example, a centrifugal force when the user is in motion.

Note that although the present embodiment has been described using an example in which the camera 1 is worn so that the main body unit 10 is located approximately in front of the collarbones of the user, no limitation is intended by this. The camera 1 may be worn on any location on the user's body, except for the head, as long as the face direction detection unit 20 can detect the user's observing direction and the shooting unit 40 can perform shooting in this observing direction.

Figure 1C:
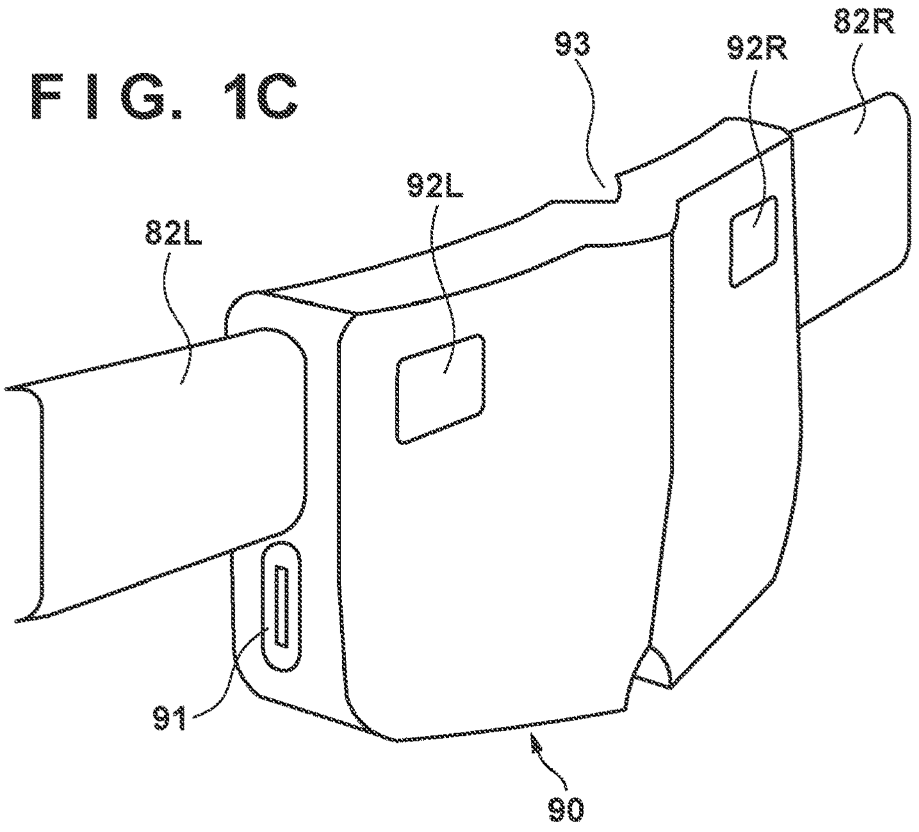
FIG. 1C is a diagram of a battery unit as viewed from behind FIG. 1A.

FIG. 1C is a diagram of the battery unit 90 as viewed from behind FIG. 1A.

In FIG. 1C, the battery unit 90 includes a charging cable socket 91, adjustment buttons 92L and 92R, and a spine avoidance slit 93.

The charging cable socket 91 is a socket into which a non-illustrated charging cable is inserted. An external power supply can charge internal batteries 94 and supply power to the main body unit 10 via the charging cable inserted into the charging cable socket 91.

The adjustment buttons 92L and 92R are buttons for adjusting the lengths of band units 82L and 82R of the mount unit 80. The adjustment button 92L is a button for adjusting the band unit 82L on the observer's left, and the adjustment button 92R is a button for adjusting the band unit 82R on the observer's right. Note that although the lengths of the band units 82L and 82R are adjusted respectively by the adjustment buttons 92L and 92R on an individual basis in the present embodiment, the lengths of the band units 82L and 82R may be simultaneously adjustable with one button. Hereinafter, the band units 82L and 82R are collectively referred to as band units 82.

The spine avoidance slit 93 is a slit for avoiding the area of the spine of the user so that the battery unit 90 does not come into contact with the area of the spine. By avoiding projections of the spine of a human body, discomfort of wearing can be alleviated, and furthermore, the camera 1 can be prevented from moving to the left or right during use.

Figure 1D:
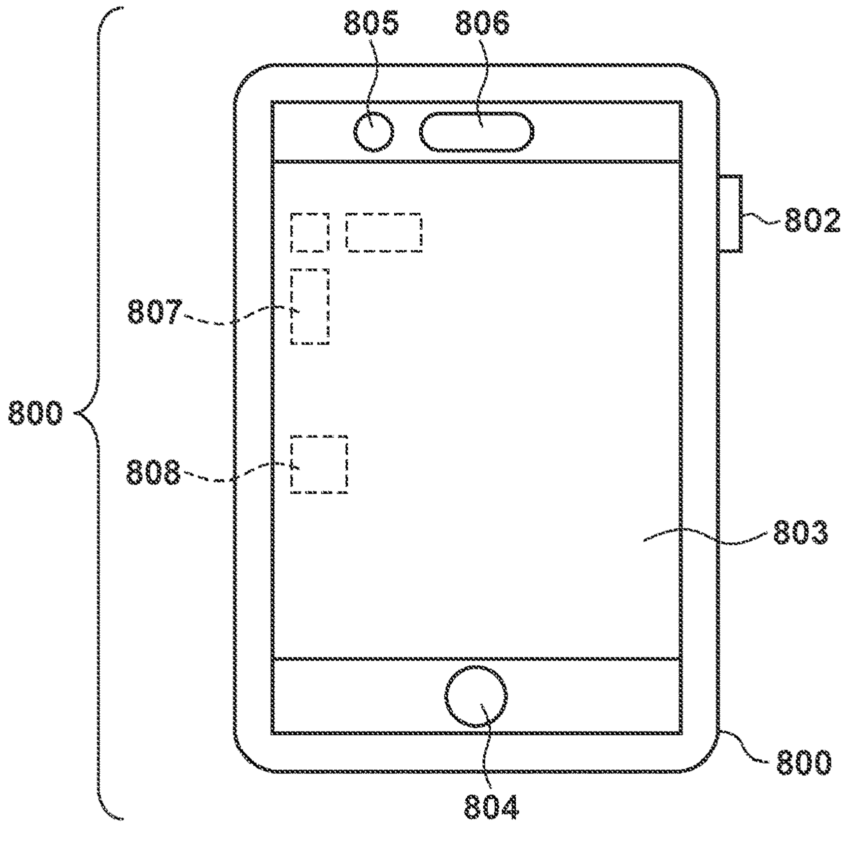
FIG. 1D is an external view of a display apparatus that is configured separately from the camera.

FIG. 1D is an external view of the display apparatus 800 as a mobile device, which is configured separately from the camera 1.

In FIG. 1D, the display apparatus 800 includes a button A 802, a display unit 803, a button B 804, a front-facing camera 805, a face sensor 806, angular velocity sensors 807, and an acceleration sensor 808. Also, a wireless LAN that enables high-speed communication with the camera 1 is included, although not shown in FIG. 1D.

The button A 802 is a button that functions as a power button of the display apparatus 800; it accepts a power on/off operation when long-pressed, and accepts instructions at other processing timings when short-pressed.

The display unit 803 displays videos shot by the camera 1, and displays menu screens necessary for settings. In the present embodiment, a transparent touch sensor is provided on a top surface of the display unit 803, and a touch operation performed on a screen that is currently displayed (e.g., a menu screen) can also be accepted.

The button B 804 functions as a calibration button 854 used in later-described calibration processing. The front-facing camera 805 is a camera capable of taking a shot of a person observing the display apparatus 800.

The face sensor 806 can detect the shape and the observing direction of the face of the person observing the display apparatus 800. Although a specific structure of the face sensor 806 is not particularly limited, it can be realized using various types of sensors such as a structured optical sensor, a ToF sensor, and a millimeter wave radar, for example.

The angular velocity sensors 807 are situated inside the display apparatus 800, and thus indicated by dash lines as meant in a perspective view. The display apparatus 800 of the present embodiment also has a later-described calibrator function; therefore, gyroscope sensors corresponding to three directions, namely X, Y, and Z, are mounted thereon. Note that the acceleration sensor 808 detects an orientation of the display apparatus 800.

A general smartphone is used as the display apparatus 800 of the present embodiment. The camera system of the present embodiment can be realized by making firmware on this smartphone compatible with firmware on the camera 1. Note that the camera system of the present embodiment can be realized also by making firmware on the camera 1 compatible with an application or an OS of the smartphone used as the display apparatus 800.

FIG. 2A to FIG. 2G are diagrams showing a configuration of the main body unit 10 in detail. In the subsequent drawings, components that have already been described are given the same reference signs, and a description thereof is omitted.

Figure 2A:
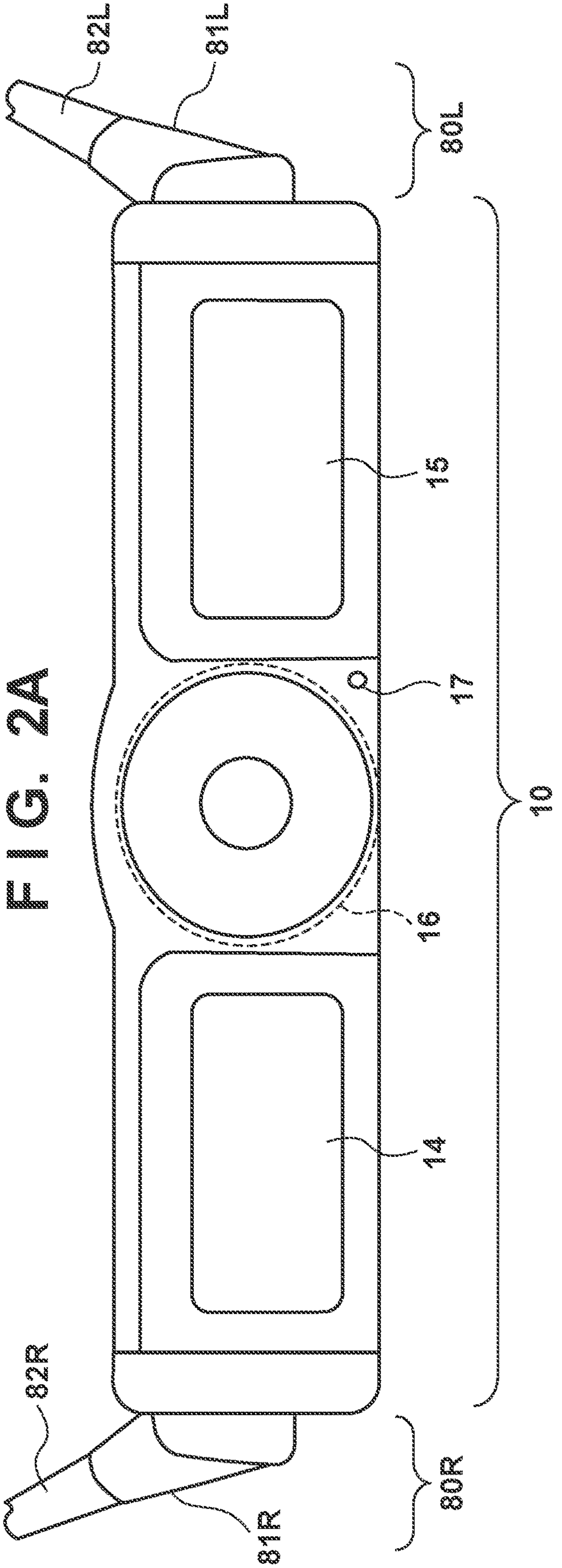
FIG. 2A is a front view of a shooting and detection unit.

FIG. 2A is a front view of the main body unit 10.

The mount unit 80 is connected to the main body unit 10 via a right connection unit 80R located on the right side of the user's body (the observer's left in FIG. 2A), and a left connection unit 80L located on the left side of the user's body (the observer's right in FIG. 2A). Specifically, the mount unit 80 is composed of angle maintaining units 81 made of a hard material for maintaining the angle with the main body unit 10, and the band units 82. The right connection unit 80R includes the angle maintaining unit 81R and the band unit 82R, and the left connection unit 80L includes the angle maintaining unit 81L and the band unit 82L.

Figure 2B:
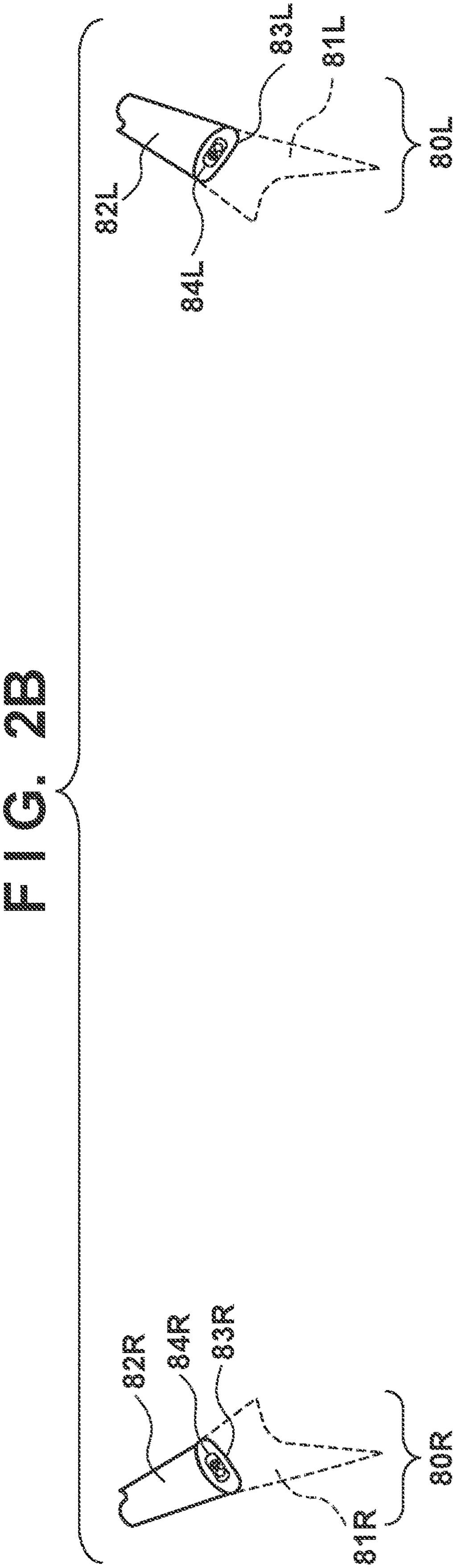
FIG. 2B is a diagram showing the shape of band units of connection units.

FIG. 2B is a diagram showing the shape of the band units 82 of the mount unit 80. In this diagram, the angle maintaining units 81 are indicated by dash lines to show the shape of the band units 82.

The band units 82 include connection surfaces 83 and an electrical cable 84. The connection surfaces 83 are surfaces where the angle maintaining units 81 and the band units 82 are connected, and have a cross-sectional shape that is not a perfect circle; here, they have an elliptic shape. Hereinafter, among the connection surfaces 83, the connection surface 83 located on the right side of the user's body (the observer's left in FIG. 2B) when the camera 1 is worn will be referred to as a right connection surface 83R, whereas the connection surface 83 located on the left side thereof (the observer's right in FIG. 2B) will be referred to as a left connection surface 83L. The right connection surface 83R and the left connection surface 83L are in a positional relationship where together they form the shape of a Japanese katakana character "ha". That is to say, the distance between the right connection surface 83R and the left connection surface 83L decreases with distance from the observer's lower side toward the observer's upper side in FIG. 2B. Consequently, when the camera 1 is hung around the user's neck, the major axis direction of the connection surfaces 83 of the mount unit 80 extends in the direction along the user's body. This achieves the advantageous effect of providing comfort when the band units 82 are in contact with the user's body, and also making it less likely for the main body unit 10 to move in the left, right, front, and back directions.

The electrical cable 84 is arranged inside the band units 82, and electrically connects together the battery unit 90, the microphones 19R and 19L, and the main body unit 10. The electrical cable 84 is used to supply power of the battery unit 90 to the main body unit 10, and to exchange electrical signals with the outside. FIG. 2B shows an example in which an electrical cable 84L is arranged inside the band unit 82L on the left, whereas an electrical cable 84R is arranged inside the band unit 82R on the right. Although the present embodiment has described an example in which the electrical cables 84L and 84R are arranged in both of the left and right band units 82L and 82R, it is sufficient that necessary power and signals be exchangeable, and it is possible to make a change so that the electrical cable be arranged only inside the band unit on one side.

Figure 2C:
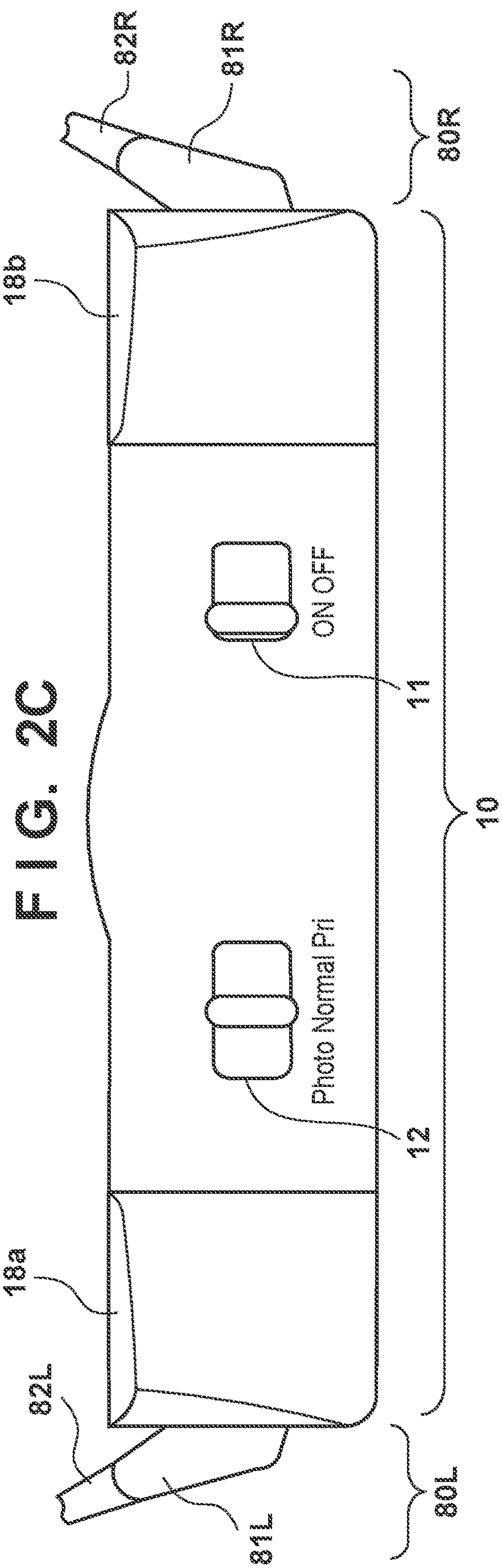
FIG. 2C is a rear view of the shooting and detection unit.

FIG. 2C is a rear view of the main body unit 10. FIG. 2C is a diagram of a view from the side that comes into contact with the user's body, that is to say, the opposite side of FIG. 2A, and thus the positional relationship between the right connection unit 80R and the left connection unit 80L therein is the reverse of that in FIG. 2A. The main body unit 10 has a power supply switch 11, a shooting mode switch 12, and chest attachment pads 18 on a back side thereof.

The power supply switch 11 is a switch for switching between power on and off of the camera 1. Although the power supply switch 11 of the present embodiment is a switch in a form of a sliding lever, it is not limited thereto. For example, the power supply switch 11 may be a push-type switch, or may be a switch that is configured integrally with a non-illustrated sliding cover of the photographing lens 16.

The shooting mode switch 12 is a switch for changing a shooting mode, and can change among modes related to shooting. In the present embodiment, the shooting mode switch 12 can change the shooting mode to a still image mode, a moving image mode, and a later-described preset mode that uses the display apparatus 800. In the present embodiment, the shooting mode switch 12 is a switch in a form of a sliding lever in which the lever is slid to select one of "Photo", "Normal", and "Pri" shown in FIG. 2C. The shooting mode transitions to the still image mode when the lever has been slid to "Photo", and transitions to the moving image mode when the lever has been slid to "Normal". Also, the shooting mode transitions to the preset mode when the lever has been slid to "Pri". Note that the shooting mode switch 12 is not limited to embodiments of the present embodiment as long as it is a switch that can change the shooting mode. For example, it may be composed of three buttons corresponding to "Photo", "Normal", and "Pri".

The chest attachment pads 18 are components that come into contact with the user's body when the main body unit 10 is pushed against the user's body. As shown in FIG. 2A, the main body unit 10 is formed in such a manner that, when worn, the horizontal (left-right) total length thereof is longer than the vertical (up-down) total length thereof, and the chest attachment pads 18 are arranged in the vicinity of the left and right ends of the main body unit 10. With such an arrangement, blurring associated with leftward or rightward rotation can be suppressed during shooting performed by the camera 1. Furthermore, the presence of the chest attachment pads 18 can prevent the power supply switch 11 and the shooting mode switch 12 from touching the user's body. Moreover, the chest attachment pads 18 also play a role in preventing transmission of heat to the user's body when the temperature of the main body unit 10 has increased as a result of shooting over a long duration, and a role in adjusting the angle of the main body unit 10.

Figure 2D:
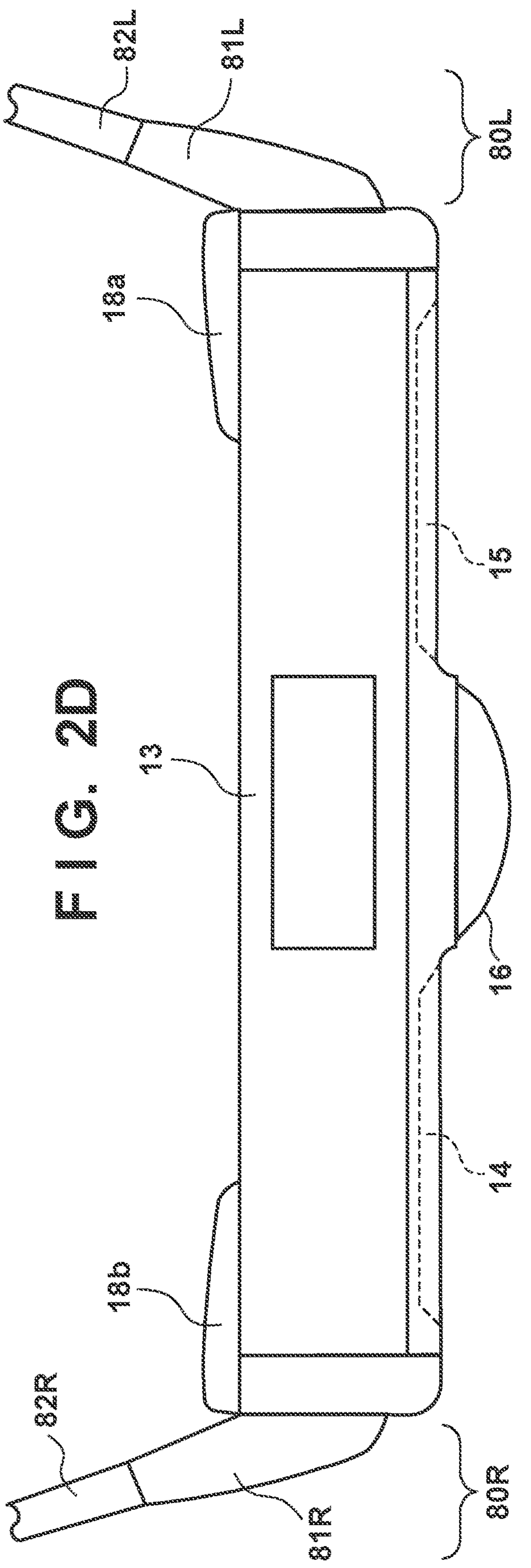
FIG. 2D is a top view of the shooting and detection unit.
Figure 2E:
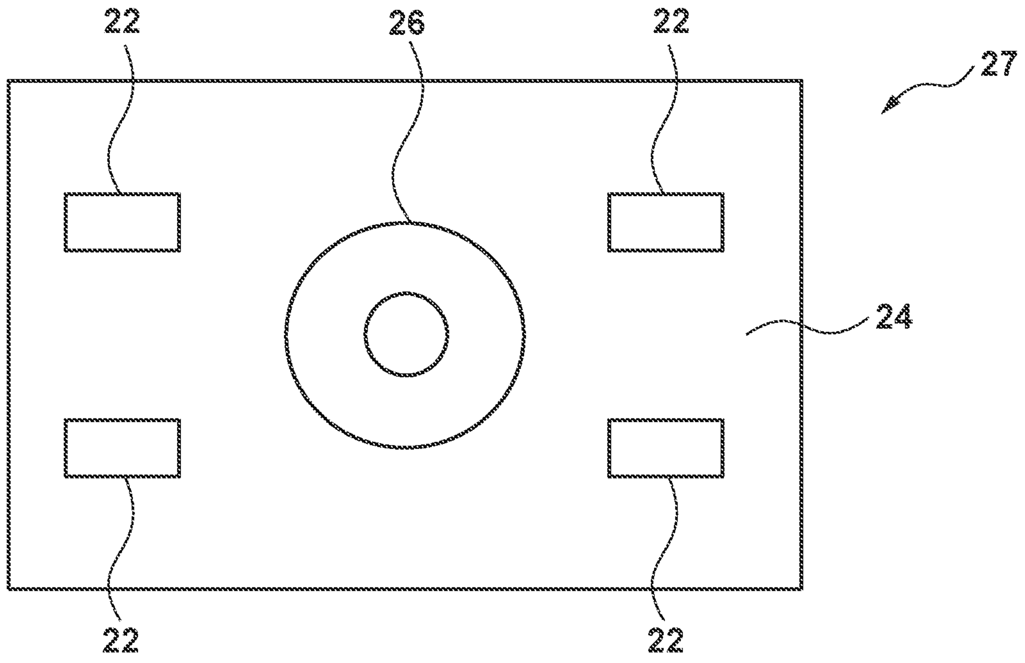
FIG. 2E is a diagram showing a configuration of an infrared detection processing apparatus that is arranged below a face direction detection window.

FIG. 2D is a top view of the main body unit 10.

As shown in FIG. 2D, the face direction detection window 13 is provided in a central portion of a top surface of the main body unit 10, and furthermore, the chest attachment pads 18 project from the main body unit 10.

FIG. 2E is a diagram showing a configuration of an infrared detection processing apparatus 27 that is arranged inside the main body unit 10 and below the face direction detection window 13.

The infrared detection processing apparatus 27 includes the infrared LEDs 22 and the infrared light collecting lens 26. The infrared LEDs 22 project infrared light 23 (see FIG. 5) toward the user. The infrared light collecting lens 26 forms an image of reflected light rays 25 (see FIG. 5) that have been reflected by the user following the light projection from the infrared LEDs 22 on a non-illustrated sensor (light receiving element) of the infrared detection processing apparatus 27.

Figure 2F:
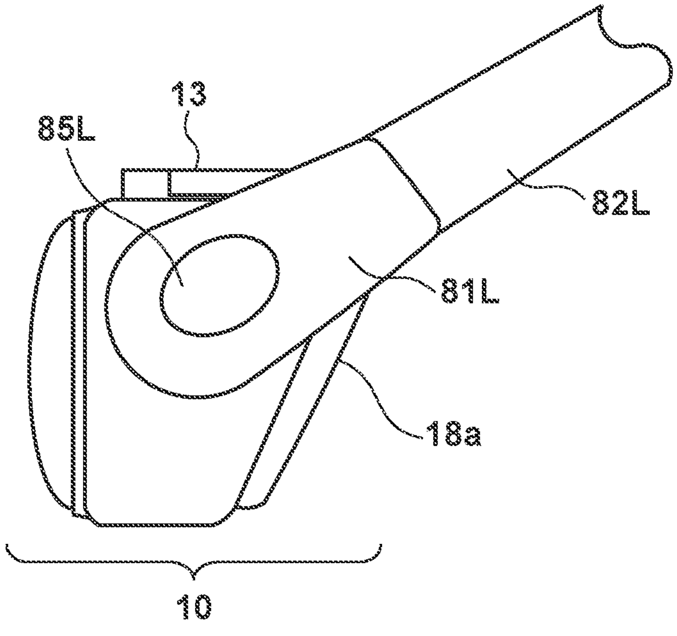
FIG. 2F is a diagram of the camera as viewed from the left side of the user.

FIG. 2F is a diagram showing a state where the camera 1 is hung around the user's neck as viewed from the left side of the user.

An angle adjustment button 85L is a button provided on the angle maintaining unit 81L, and is used to adjust the angle of the main body unit 10. Note that, although not shown in the present drawing, an angle adjustment button 85R is also arranged on the angle maintaining unit 81R, which is located on the opposite side, at a position that forms symmetry with the angle adjustment button 85L. Hereinafter, the angle adjustment buttons 85R and 85L will be referred to as angle adjustment buttons 85 when they are mentioned collectively.

Although the angle adjustment buttons 85 are located at positions that are visible also in FIG. 2A, FIG. 2C, and FIG. 2D, they are omitted therefrom for the sake of simple explanation.

The user can change the angle between the main body unit 10 and the angle maintaining units 81 by moving the angle maintaining units 81 in the up or down direction in FIG. 2F while pressing the angle adjustment buttons 85. Also, the angle of projection of the chest attachment pads 18 can be changed. In the main body unit 10, the action of these two types of angle changing members (the angle adjustment buttons 85 and the chest attachment pads 18) allows the direction of the photographing lens 16 to be adjusted to be level in accordance with individual differences in the position and shape of the chest among users.

Figure 2G:
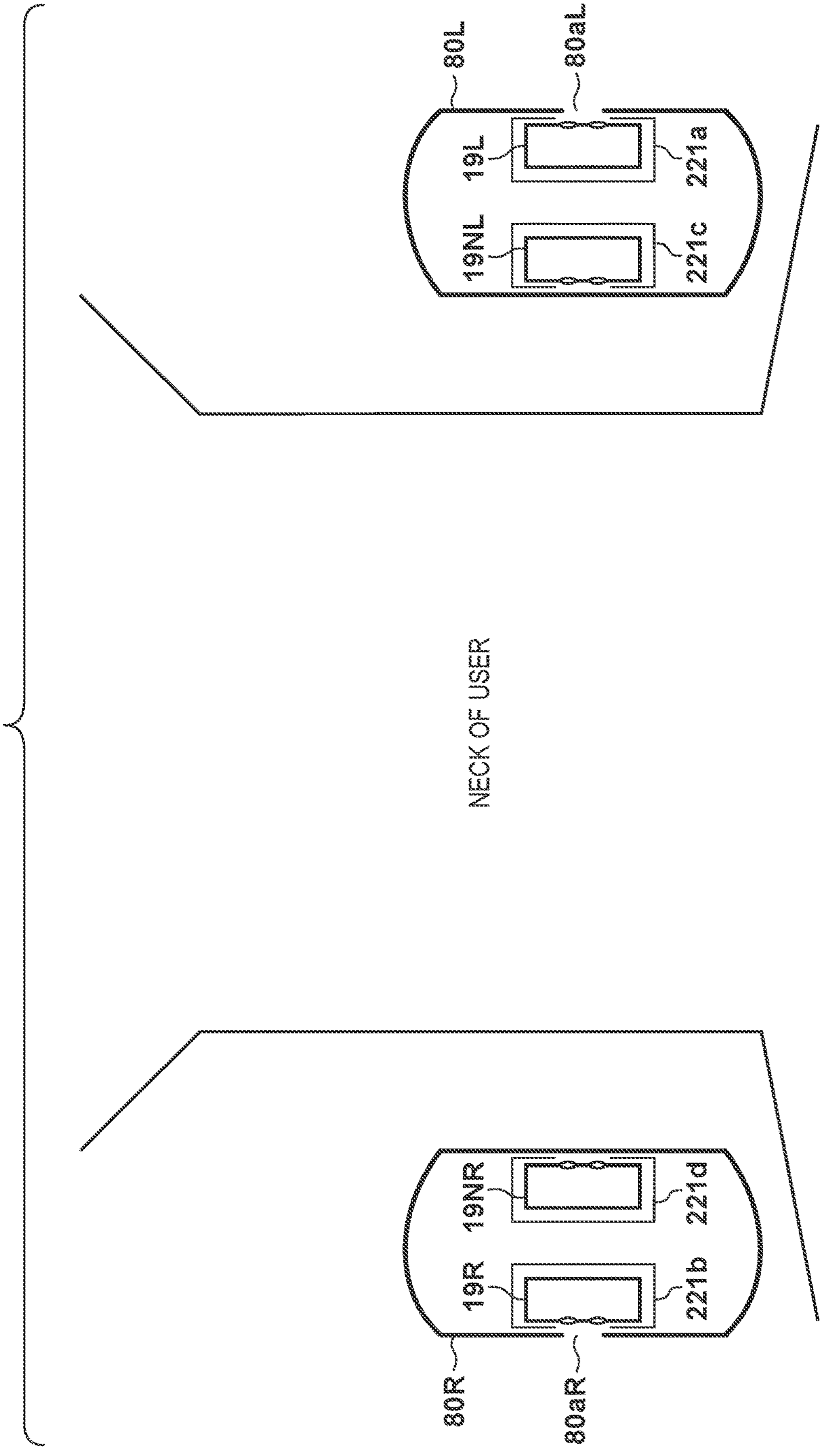
FIG. 2G is a cross-sectional diagram showing an arrangement of microphones inside the band units.

FIG. 2G is a cross-sectional diagram which shows a state where the user is wearing the camera 1, and in which a cut has been made on a vertical plane that intersects with the microphone 19L and the microphone 19R.

A microphone bushing 221*a* is arranged on the outer circumferential side in the cross-section of a mount unit 80L, and the microphone 19L for converting sounds that have been taken in from the left surrounding side of the user into electrical signals is arranged inside the microphone bushing 221*a*. The opening 80*a*L for taking in external environmental sounds is formed in the mount unit 80L at a position corresponding to the microphone 19L. The microphone 19L is composed of, for example, an electret condenser microphone (ECM). The microphone bushing 221*a* is formed of a rubber material, and fixes the microphone 19L so that the microphone 19L adheres tightly to an inner wall of the mount unit 80L.

A microphone 19NL is a microphone for mainly obtaining a noise due to vibration which is generated when the mount unit 80L has come into contact with the left side of the user's neck. The microphone 19NL is a microphone for converting vibration transmitted through the mount unit 80L, as sounds, into electrical signals, and is arranged inside a microphone bushing 221*c* located on the inner circumferential side in the cross-section of the mount unit 80L, similarly to the microphone 19L. As the microphone 19NL is a microphone for obtaining a noise due to vibration transmitted through the mount unit 80L, an opening for taking in environmental sounds is not formed in the mount unit 80L at a position corresponding to the microphone 19NL. The microphone 19L obtains sounds on the left surrounding side of the user, whereas the microphone 19NL obtains a noise due to vibration propagated through the mount unit 80L on the left side of the user. Note that the distance between a sound hole of the microphone 19L and a sound hole of the microphone 19NL is set to a distance smaller than a wavelength of a main component of environmental sounds (sounds to be obtained) so that noise included in the microphone 19L can be reduced.

The microphone 19R is configured similarly to the microphone 19L, and they are placed to exhibit a left-right symmetrically with respect to the camera 1. A microphone bushing 221*b* is arranged on the outer circumferential side in the cross-section of a mount unit 80R, and the microphone 19R for converting sounds that have been taken in from the right surrounding side of the user into electrical signals is arranged inside the microphone bushing 221*b*. The opening 80*a*R for taking in external environmental sounds is formed in the mount unit 80R at a position corresponding to the microphone 19R. The microphone 19R is composed of, for example, an electret condenser microphone (ECM). The microphone bushing 221*b* is formed of a rubber material, and fixes the microphone 19R so that the microphone 19R adheres tightly to an inner wall of the mount unit 80R.

A microphone 19NR is a microphone for mainly obtaining a noise due to vibration which is generated when the mount unit 80R has come into contact with the right side of the user's neck. The microphone 19NR is a microphone for converting vibration transmitted through the mount unit 80R, as sounds, into electrical signals, and is arranged inside a microphone bushing 221*d* located on the inner circumferential side in the cross-section of the mount unit 80R, similarly to the microphone 19R. As the microphone 19NR is a microphone for obtaining a noise due to vibration transmitted through the mount unit 80R, an opening for taking in environmental sounds is not formed in the mount unit 80R at a position corresponding to the microphone 19NR. The microphone 19R obtains sounds on the right surrounding side of the user, whereas the microphone 19NR obtains undesired sounds attributed to vibration propagated through the mount unit 80R on the right side of the user. Note that the distance between a sound hole of the microphone 19R and a sound hole of the microphone 19NR is set to a distance smaller than a wavelength of a main component of environmental sounds (sounds to be obtained) so that noise included in the microphone 19NR can be reduced.

Note that although the microphone 19L and the microphone 19NL oppose each other according to the arrangement shown in FIG. 2G, it is sufficient to place them close to each other so that the distance between the positions of their respective sound holes is smaller than a wavelength of a main component of environmental sounds as stated earlier. For this reason, the position of the microphone 19NL is determined based on the position of the microphone 19L. It is sufficient to place the microphone 19L and the microphone 19NL so that the difference between the level of sounds obtained by the microphone 19L and the level of sounds obtained by the microphone 19NL does not become large. The same goes for the microphone 19R and the microphone 19NR.

Figure 3A:
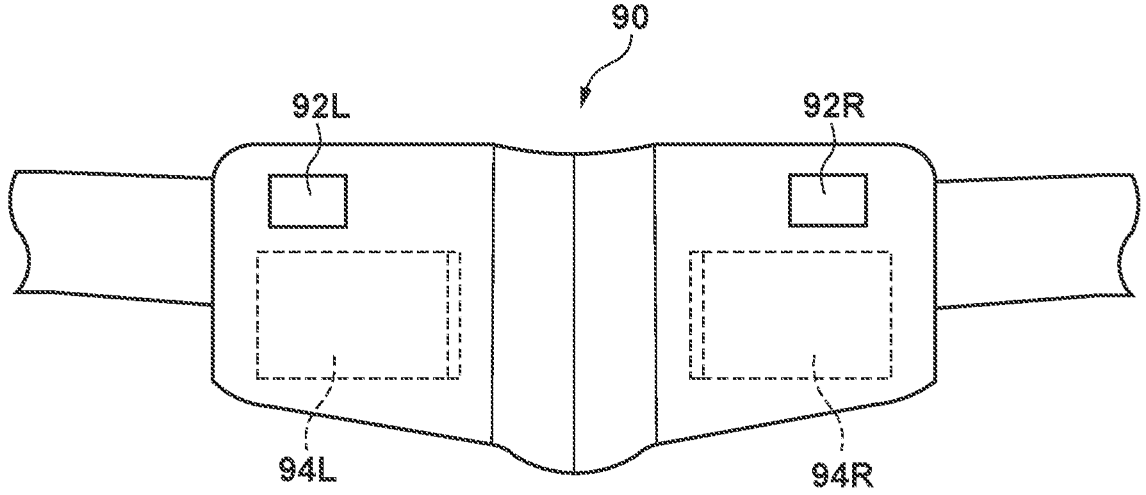
FIGS. 3A to 3C are diagrams for describing the details of the battery unit.
Figure 3B:
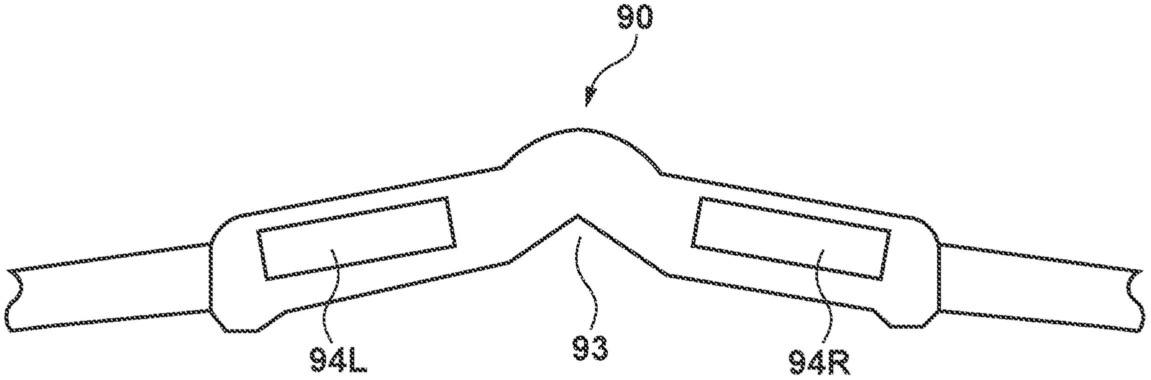
Figure 3C:
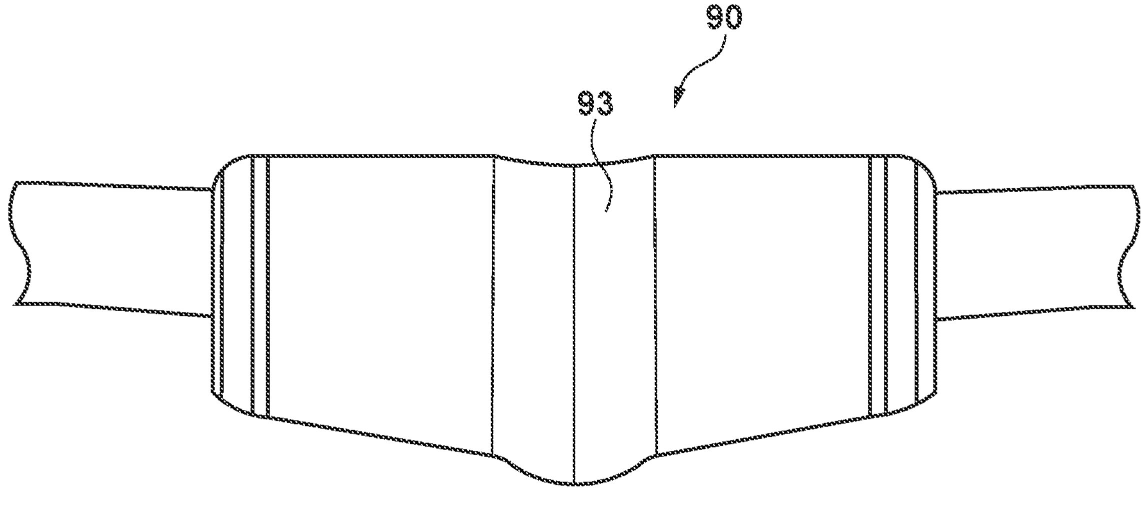

FIGS. 3A to 3C are diagrams for describing a detailed configuration of the battery unit 90.

FIG. 3A is a partially perspective view of the battery unit 90 as viewed from a back side. As shown in FIG. 3A, two batteries, namely, the left battery 94 L and the right battery 94 R (hereinafter also referred to as batteries 94 collectively) are symmetrically arranged inside the battery unit 90 so as to keep a balance of weight of the battery unit 90. As a result of arranging the batteries 94 symmetrically with respect to a central portion of the battery unit 90 in the above-described manner, the balance of weight is kept between left and right, and positional displacement of the camera 1 is prevented. Note that the battery unit 90 may be configured such that only one battery is provided therein, or may be configured such that three or more batteries are provided therein.

FIG. 3B is a top view of the battery unit 90. In this diagram, too, the batteries 94 are shown in a perspective manner, and a positional relationship between the spine avoidance slit 93 and the batteries 94 is clearly shown. As a result of arranging the batteries 94 on both sides of the spine avoidance slit 93 so that they oppose each other in the above-described manner, the user can wear the battery unit 90, which is relatively heavy, without burden.

FIG. 3C is a rear view of the battery unit 90, and is a diagram thereof as viewed from the side that comes into contact with the user's body, that is to say, the opposite side of FIG. 3A. As shown in FIG. 3C, the spine avoidance slit 93 is provided at the center along the spine of the user.

Figure 4:
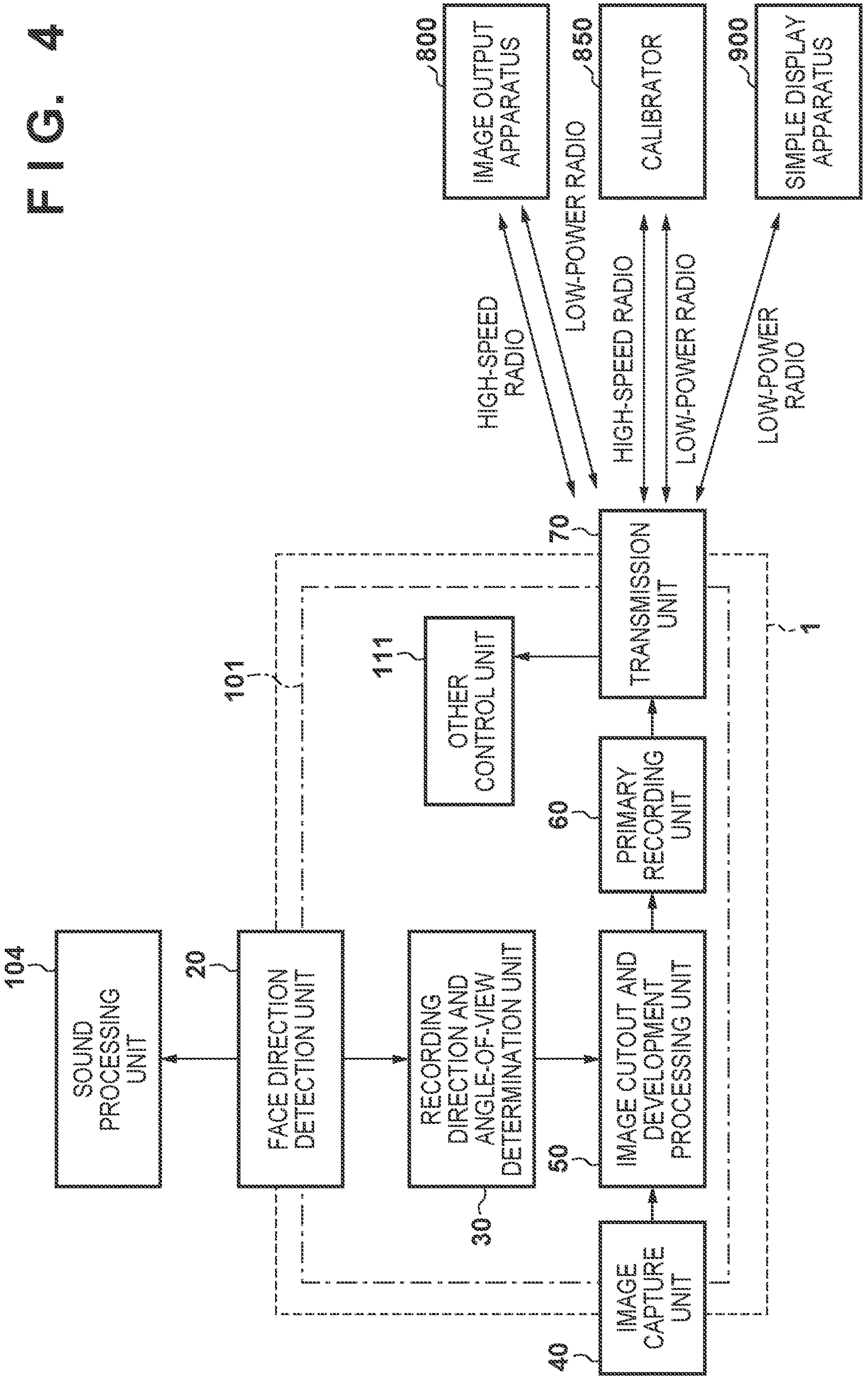
FIG. 4 is a diagram showing a functional block configuration of the camera.

FIG. 4 is a functional block diagram of the camera 1. A description is now given of a flow of rough processing executed by the camera 1 with use of FIG. 4. The details will be described later.

In FIG. 4, the camera 1 includes a face direction detection unit 20, a recording direction and angle-of-view determination unit 30, a shooting unit 40, an image cutout and development processing unit 50, a primary recording unit 60, a transmission unit 70, and an other control unit 111. Each of these blocks is controlled by an overall control CPU 101 (see FIG. 5) that performs overall control of the camera 1.

The face direction detection unit 20 is a functional block composed of the infrared LEDs 22, the infrared detection processing apparatus 27, and so forth, analogizes an observing direction by detecting the direction of the user's face, and transmits the same to the recording direction and angle-of-view determination unit 30 and the sound processing unit 104.

The recording direction and angle-of-view determination unit 30 performs various types of computation based on the observing direction of the user analogized by the face direction detection unit 20, determines information of a position and a range that are used to perform a cutout from videos from the image capture unit 40, and transmits this information to the image cutout and development processing unit 50.

The image capture 40 converts light rays from a subject into image signals, and transmits these image signals to the image cutout and development processing unit 50.

The image cutout and development processing unit 50 performs a cutout from image signal from the image capture unit 40 and develops the cutout result using the information from the recording direction and angle-of-view determination unit 30, and transmits only videos in the direction viewed by the user to the primary recording unit 60.

The primary recording unit 60 is a functional block composed of a primary memory 103 (see FIG. 5) and the like, records video information, and transmits the same to the transmission unit 70 at a necessary timing.

The transmission unit 70 performs radio communication with the display apparatus 800 (see FIG. 1D), a calibrator 850, and a simple display apparatus 900 that are communication partners that have been determined in advance.

The display apparatus 800 is a display apparatus that can communicate with the transmission unit 70 via a wireless LAN that enables high-speed communication (hereinafter referred to as "high-speed radio"). Here, although the present embodiment uses radio communication compatible with the IEEE 802.11ax (Wi-Fi 6) standard as the high-speed radio, radio communication compatible with another standard, such as the Wi-Fi 4 standard and the Wi-Fi 5 standard, may be used thereas. Also, the display apparatus 800 may be a device that has been developed exclusively for the camera 1, or may be a general smartphone, tablet terminal, or the like.

Note that in communication between the transmission unit 70 and the display apparatus 800, low-power radio may be used, both of the high-speed radio and low-power radio may be used, or they may be used in alternation. In the present embodiment, high-volume data such as video files of videos composed of moving images, which will be described later, is transmitted over the high-speed radio, whereas low-volume data and data that can be transmitted over a long period of time are transmitted over the low-power radio. Here, although the present embodiment uses Bluetooth as the low-power radio, another close-range (short-range) radio communication, such as near-field communication (NFC), may be used thereas.

The calibrator 850 is a device that configures initial settings and personalized settings for the camera 1, and is a device that can communicate with the transmission unit 70 over the high-speed radio, similarly to the display apparatus 800. The details of the calibrator 850 will be described later. Furthermore, the display apparatus 800 may additionally have the functions of this calibrator 850.

The simple display apparatus 900 is, for example, a display apparatus that can communicate with the transmission unit 70 only over the low-power radio. The simple display apparatus 900 is a display apparatus that cannot exchange videos composed of moving images with the transmission unit 70 due to temporal constraints, but can exchange timing signals for starting and stopping shooting, exchange images that are simply intended for confirmation of the composition, etc. Furthermore, the simple display apparatus 900 may be a device that has been developed exclusively for the camera 1, similarly to the display apparatus 800, or may be a smartwatch or the like.

Figure 5:
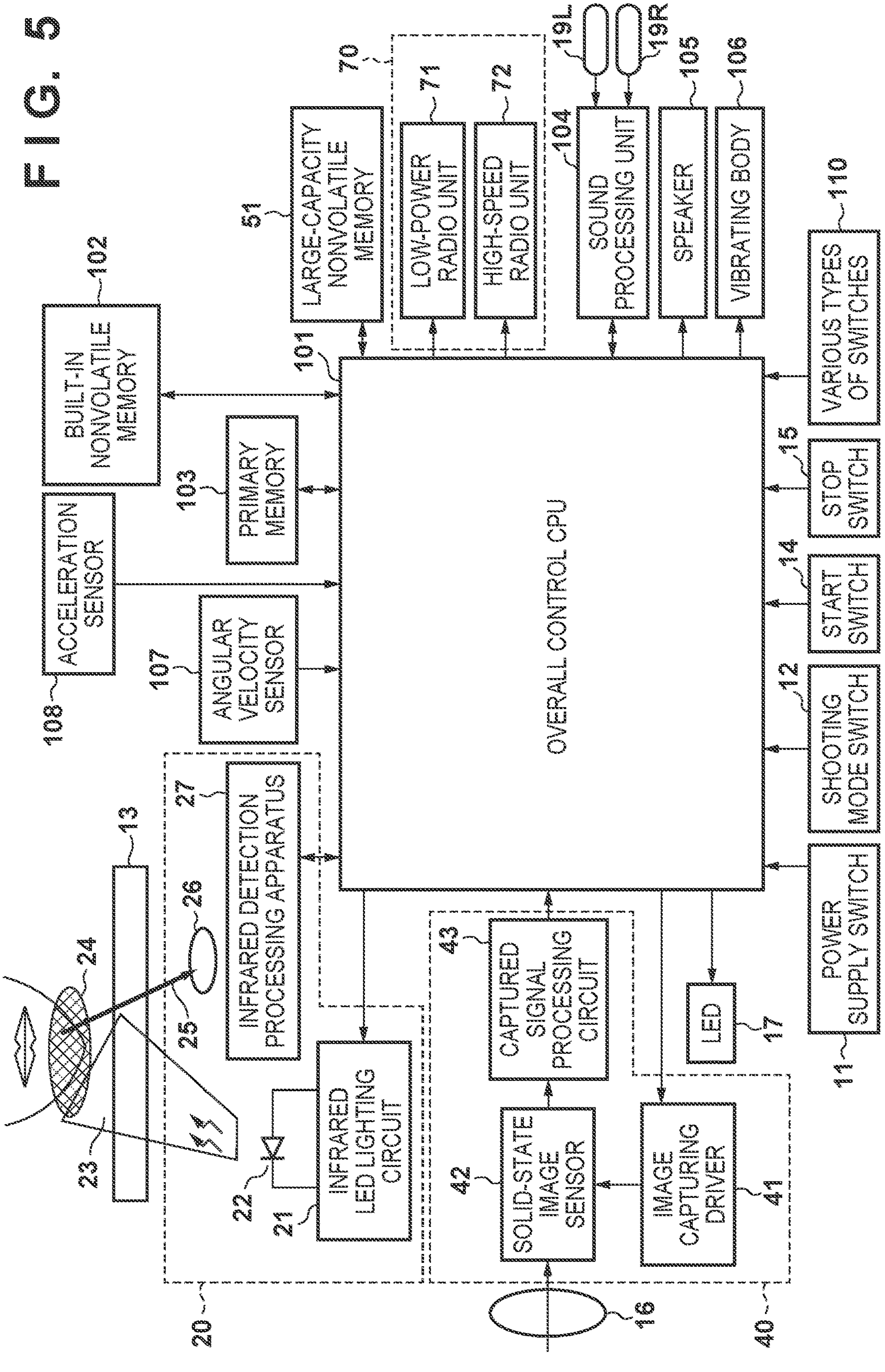
FIG. 5 is a block diagram showing a hardware configuration of the camera.

FIG. 5 is a block diagram showing a hardware configuration of the camera 1. Note that the constituents and functions that have been described using FIG. 1A to FIG. 1C and the like are given the same reference signs, and a detailed description thereof is omitted. Among the components of FIG. 5, the blocks other than the microphones 19L and 19R are each provided in the main body unit 10.

In FIG. 5, the camera 1 includes the overall control CPU 101, the power supply switch 11, the shooting mode switch 12, the face direction detection window 13, the start switch 14, the stop switch 15, the photographing lens 16, and the LED 17.

The camera 1 also includes an infrared LED lighting circuit 21, the infrared LEDs (infrared light-emitting diodes) 22, the infrared light collecting lens 26, and the infrared detection processing apparatus 27 that compose the face direction detection unit 20 (see FIG. 4).

Furthermore, the camera 1 includes the image capture unit 40 (see FIG. 4) composed of image capturing driver 41, the solid-state image sensor 42, and a captured signal processing circuit 43, and the transmission unit 70 (see FIG. 4) composed of a low-power radio unit 61 and a high-speed radio unit 62.

Note that although the camera 1 includes only one image capture unit 40 in the present embodiment, it may include two or more image capture units 40. Providing a plurality of image capturing units also enables shooting of 3D videos, shooting of videos with the angle of view wider than the angle of view that can be achieved using one image capture unit 40, shooting in a plurality of directions, and so forth.

The camera 1 also includes various types of memories such as a large-capacity nonvolatile memory 51, a built-in nonvolatile memory 102, and the primary memory 103.

Moreover, the camera 1 includes the sound processing unit 104, a speaker 105, a vibrating body 106, an angular velocity sensor 107, an acceleration sensor 108, and various types of switches 110.

The overall control CPU 101 controls the entirety of the camera 1. The recording direction and angle-of-view determination unit 30, the image cutout and development processing unit 50, and the other control unit 111 shown in FIG. 4 are realized by the overall control CPU 101 executing a program stored in, for example, the primary memory 103.

The infrared LED lighting circuit 21 controls the infrared LEDs 22 shown in FIG. 2E to be turned on and turned off, thereby controlling the projection of infrared light 23 from the infrared LEDs 22 toward the user. The face direction detection window 13 is composed of a visible light cutoff filter; it hardly allows visible light rays to be transmitted therethrough, but allows infrared light 23 and reflected light rays 25 thereof, which are light in the infrared region, to be transmitted therethrough. The infrared light collecting lens 26 is a lens that collects the reflected light rays 25.

The infrared detection processing apparatus 27 includes a sensor that detects the reflected light rays 25 collected by the infrared light collecting lens 26. This sensor converts the reflected light rays 25, which have been collected by the infrared light collecting lens 26 to form an image thereof, into sensor data by way of photoelectric conversion, and transmits the sensor data to the overall control CPU 101.

As shown in FIG. 1B, when the camera 1 is hung around the user's neck, the face direction detection window 13 is located below the user's chin. Therefore, as shown in FIG. 5, the infrared light 23 projected from the infrared LEDs 22 is transmitted through the face direction detection window 13 and irradiates an infrared light irradiation surface 24, which is a skin surface in the vicinity of the user's chin. The infrared light 23 that has been reflected off the infrared light irradiation surface 24 is transmitted through the face direction detection window 13 as the reflected light rays 25, and collected toward the sensor inside the infrared detection processing apparatus 27 via the infrared light collecting lens 26.

The various types of switches 110 are not shown in FIG. 1A to FIG. 1C and the like. These switches are switches for executing the functions that are not directly related to the present embodiment.

The image capturing driver 41 includes a timing generator and the like, and generates various types of timing signals. It also controls shooting operations by outputting the timing signals to respective units related to image capturing. The solid-state image sensor 42 photoelectrically converts a subject image formed by the photographing lens 16 shown in FIG. 1A, and outputs the resultant video signals to the captured signal processing circuit 43. The captured signal processing circuit 43 generates shooting data by executing clamp processing, A/D conversion processing, and the like with respect to the signals from the solid-state image sensor 42, and outputs the shooting data to the overall control CPU 101.

A flash memory or the like is used as the built-in nonvolatile memory 102; an activation program for the overall control CPU 101 and setting values of various types of program modes are stored therein. In the camera 1 of the present embodiment, alteration of the field of view for observation (the angle of view) and the effective level of anti-vibration control can be set, and thus setting values therefor are also recorded in the built-in nonvolatile memory 102.

The primary memory 103 is composed of a RAM or the like; it temporarily stores video data that is currently processed, and temporarily stores the results of computation performed by the overall control CPU 101. The large-capacity nonvolatile memory 51 is used in recording or readout of primary image data. Although the large-capacity nonvolatile memory 51 is described as a semiconductor memory that does not have a removable/attachable mechanism in the present embodiment to facilitate the understanding of explanation, no limitation is intended by this. For example, the large-capacity nonvolatile memory 51 may be composed of a removable/attachable recording medium, such as an SD card, or may be used in combination with the built-in nonvolatile memory 102.

The low-power radio unit 61 performs data communication with the display apparatus 800, the calibrator 850, and the simple display apparatus 900 over the low-power radio. The high-speed radio unit 62 performs data communication with the display apparatus 800, the calibrator 850, and the simple display apparatus 900 over the high-speed radio.

The sound processing unit 104 generates sound signals by processing analog signals that have been picked up by the microphones 19L and 19R for picking up external environmental sounds, which are on the observer's right and the observer's left, respectively, in FIG. 1A.

The LED 17, the speaker 105, and the vibrating body 106 notify the user of a status of the camera 1 and issue a warning by emitting light, producing a sound, and producing vibration.

The angular velocity sensor 107 is a sensor that uses a gyroscope or the like, and detects a movement of the camera 1 itself. The acceleration sensor 108 detects an orientation of the main body unit 10. Note that the angular velocity sensor 107 and the acceleration sensor 108 are built in the main body unit 10; the angular velocity sensors 807 and the acceleration sensor 808 that are separate therefrom are also provided inside the later-described display apparatus 800.

Figure 6:
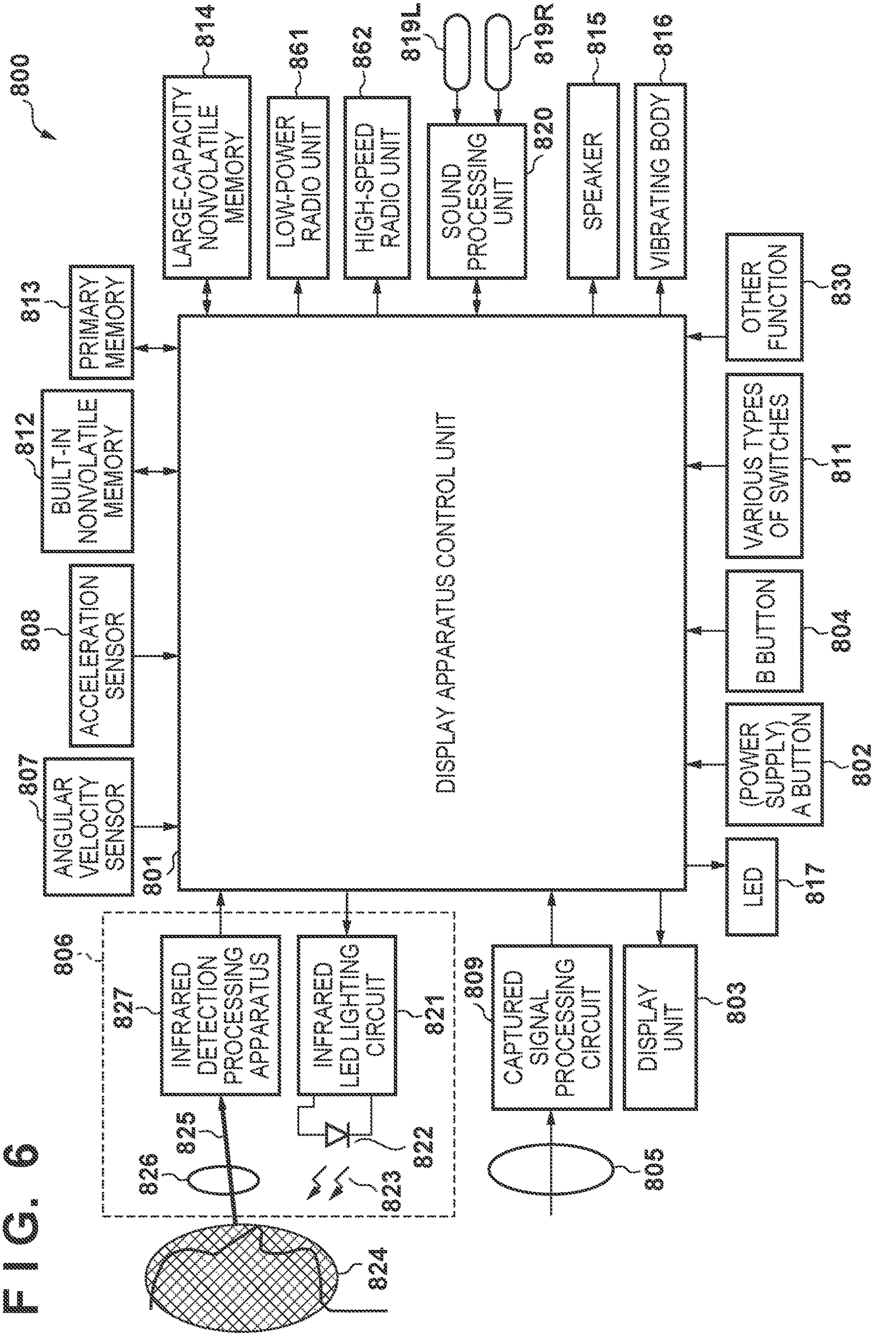
FIG. 6 is a block diagram showing a hardware configuration of the display apparatus.

FIG. 6 is a block diagram showing a hardware configuration of the display apparatus 800. Note that the parts that have been described using FIG. 1D are given the same reference signs, and a description thereof is omitted.

In FIG. 6, the display apparatus 800 includes a display apparatus control unit 801, the button A 802, the display unit 803, the button B 804, the front-facing camera 805, the face sensor 806, the angular velocity sensors 807, the acceleration sensor 808, a captured signal processing circuit 809, and various types of switches 811.

Also, the display apparatus 800 includes a built-in nonvolatile memory 812, a primary memory 813, a large-capacity nonvolatile memory 814, a speaker 815, a vibrating body 816, an LED 817, a sound processing unit 820, a low-power radio unit 861, and a high-speed radio unit 862.

The display apparatus control unit 801 is composed of a CPU, and controls the entirety of the display apparatus 800.

The captured signal processing circuit 809 bears functions equivalent to those of the image capturing driver 41, the solid-state image sensor 42, and the captured signal processing circuit 43 inside the camera 1; however, as these are not directly related to the contents of the present embodiment, they are collectively illustrated as one. Data output from the captured signal processing circuit 809 is processed inside the display apparatus control unit 801.

The various types of switches 811 are not shown in FIG. 1D. These switches are switches for executing the functions that are not directly related to the present embodiment.

The angular velocity sensor 807 is a sensor that uses a gyroscope or the like, and detects a movement of the display apparatus 800. The acceleration sensor 808 detects an orientation of the display apparatus 800.

Note that as stated earlier, the angular velocity sensor 807 and the acceleration sensor 808 are built in the display apparatus 800, and although they have functions similar to those of the angular velocity sensor 107 and the acceleration sensor 108 built in the above-described camera 1, they are separate therefrom.

A flash memory or the like is used as the built-in nonvolatile memory 812; an activation program for the display apparatus control unit 801 and setting values of various types of program modes are stored therein.

The primary memory 813 is composed of a RAM or the like; it temporarily stores video data that is currently processed, and temporarily stores the results of computation performed by the captured signal processing circuit 809. In the present embodiment, during recording of videos composed of moving images, gyroscope data that is detected by the angular velocity sensor 107 at the shooting time of each frame is held in the primary memory 813 in association with each frame.

The large-capacity nonvolatile memory 814 is used in recording or readout of image data in the display apparatus 800. In the present embodiment, the large-capacity nonvolatile memory 814 is composed of a removable/attachable memory such as an SD card. Note that it may be composed of a memory that is not removable/attachable, such as the large-capacity nonvolatile memory 51 in the camera 1.

The speaker 815, the vibrating body 816, and the LED 817 notify the user of a status of the display apparatus 800 and issue a warning by producing a sound, producing vibration, and emitting light.

The sound processing unit 820 includes a left microphone 819L and a right microphone 819R for picking up external sounds (analog signals), and generates sound signals by processing the analog signals that have been picked up.

The low-power radio unit 871 performs data communication with the camera 1 over the low-power radio. The high-speed radio unit 872 performs data communication with the camera 1 over the high-speed radio.

The face sensor 806 includes an infrared LED lighting circuit 821, an infrared LED 822, an infrared light collecting lens 826, and an infrared detection processing apparatus 827. The infrared LED lighting circuit 821 is a circuit that has functions similar to those of the infrared LED lighting circuit 21 of FIG. 5, and controls the infrared LED 822 to be turned on and turned off, thereby controlling the projection of infrared light 823 from the infrared LED 822 toward the user. The infrared light collecting lens 826 is a lens that collects reflected light rays 825 of the infrared light 823. The infrared detection processing apparatus 827 includes a sensor that detects the reflected light rays collected by the infrared light collecting lens 826. This sensor converts the reflected light rays 825 that have been collected into sensor data by way of photoelectric conversion, and transmits the sensor data to the display apparatus control unit 801.

When the face sensor 806 shown in FIG. 1D is pointed at the user, the infrared light 823 projected by the infrared LED 822 irradiates an infrared light irradiation surface 824, which is the entirety of the face of the user, as shown in FIG. 6. The infrared light 823 reflected off the infrared light irradiation surface 824 is collected as the reflected light rays 825 toward the sensor inside the infrared detection processing apparatus 827 via the infrared light collecting lens 826.

An other function unit 830 executes functions which are not directly related to the present embodiment and which are unique to a smartphone, such as a telephone function and other sensor functions.

The following describes how to use the camera 1 and the display apparatus 800.

Figure 7A:
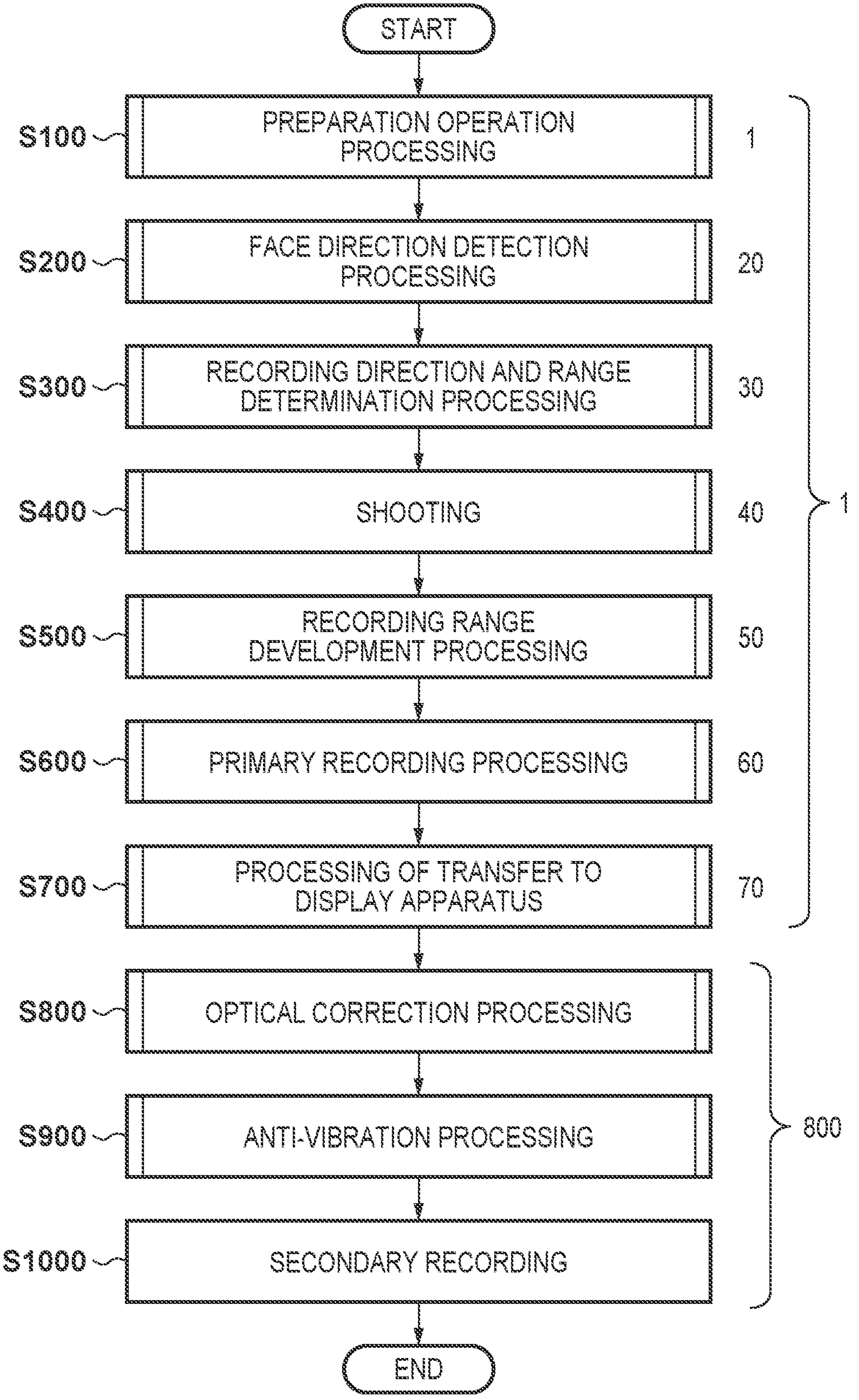
FIG. 7A is a flowchart showing an outline of shooting recording processing.

FIG. 7A is a flowchart showing an outline of shooting recording processing executed on the camera 1 and the display apparatus 800.

As a supplement to the description, FIG. 7A illustrates which one of the devices shown in FIG. 4 executes each step on the right side of that step. That is to say, steps S100 to S700 of FIG. 7A are executed on the camera 1, whereas steps S800 to S1000 of FIG. 7A are executed on the display apparatus 800.

In step S100, when the power of the camera 1 is turned on by turning the power supply switch 11 on, the overall control CPU 101 is activated, and the overall control CPU 101 reads out an activation program from the built-in nonvolatile memory 102. Thereafter, the overall control CPU 101 executes preparation operation processing for configuring settings before shooting by the camera 1. The details of the preparation operation processing will be described later using FIG. 7B.

In step S200, as a result of detection of a face direction by the face direction detection unit 20, face direction detection processing for analogizing the observing direction of the user is executed.

In step S300, the recording direction and angle-of-view determination unit 30 executes recording direction and range determination processing.

In step S400, the image capture unit 40 performs shooting and generates shooting data.

In step S500, the image cutout and development processing unit 50 executes recording range development processing in which an image is cut out from the image signal generated in step S400 with use of information of the recording direction and the angle of view determined in step S300, and processing for developing this range is executed.

In step S600, primary recording processing is executed in which the primary recording unit 60 stores the image signal developed in step S500 into the primary memory 103.

In step S700, processing of transfer to a display apparatus is executed in which the transmission unit 70 performs radio transmission of the image signal that has been primarily recorded in step S600 to the display apparatus 800 at a designated timing.

Step S800 and subsequent steps are executed on the display apparatus 800.

In step S800, the display apparatus control unit 801 executes optical correction processing for performing optical correction with respect to the image signal that has been transferred from the camera 1 in step S700.

In step S900, the display apparatus control unit 801 executes anti-vibration processing with respect to the image signal for which the optical correction has been performed in step S800.

Note that the order of step S800 and step S900 may be reversed. That is to say, the anti-vibration processing for the video may be executed first, and the optical correction may be performed later.

In step S1000, the display apparatus control unit 801 performs secondary recording that records the image signal for which the optical correction processing and the anti-vibration processing have been executed in steps S800 and S900 into the large-capacity nonvolatile memory 814, and the present processing is ended.

Figure 7B:
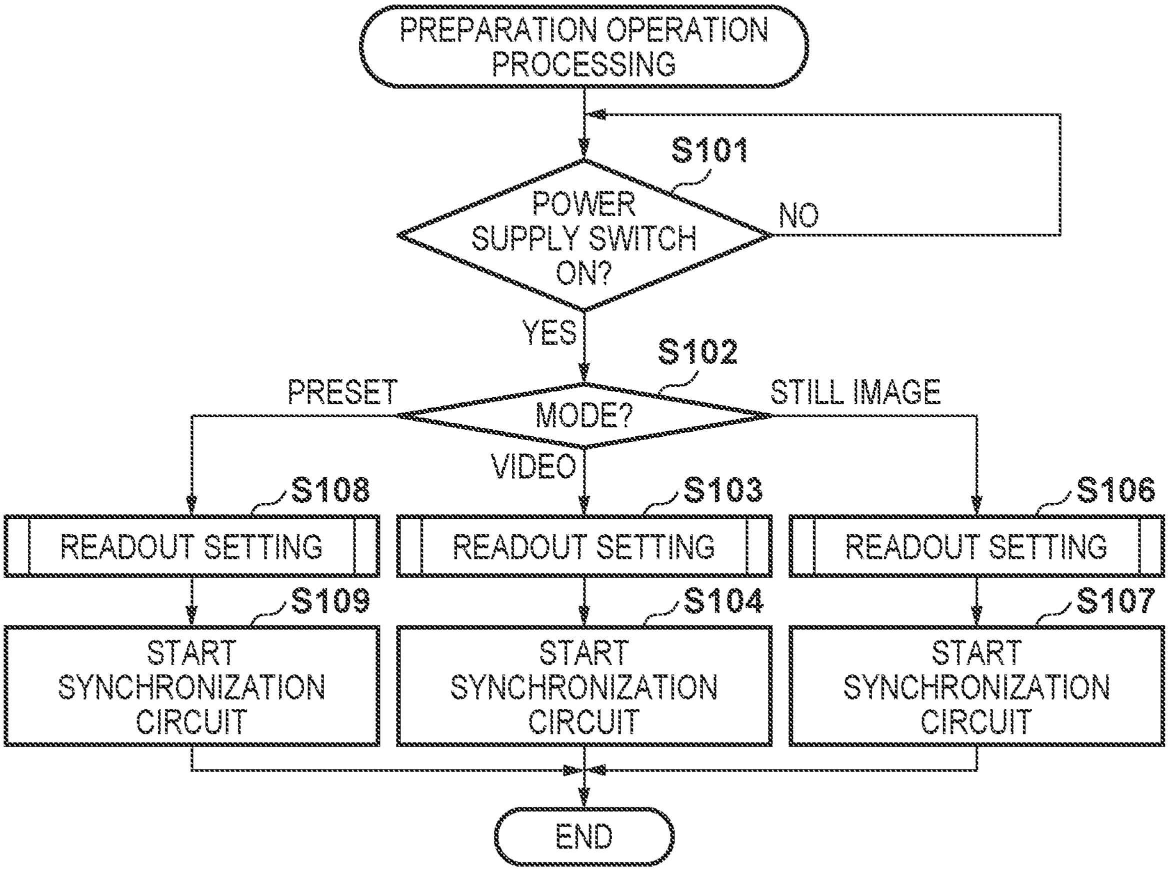
FIG. 7B is a flowchart of a subroutine of preparation operation processing.

FIG. 7B is a flowchart of a subroutine of the preparation operation processing in step S100 of FIG. 7A. Below, the present processing will be described also with reference to FIGS. 2A to 2F and FIG. 5.

In step S101, the overall control CPU 101 determines whether the power supply switch 11 is on. It stands by when the power remains off, and proceeds to step S102 when the power is turned on.

In step S102, the overall control CPU 101 determines a mode that is selected by the shooting mode switch 12. In a case where the mode selected by the shooting mode switch 12 is the moving image mode as a result of the determination, processing proceeds to step S103.

In step S103, the overall control CPU 101 reads out various types of settings for the moving image mode from the built-in nonvolatile memory 102, stores them into the primary memory 103, and then proceeds to step S104. Here, the various types of settings for the moving image mode include a setting value ang for the angle of view (which is preset to 90° in the present embodiment), and an anti-vibration level designated by "high", "medium", "off", etc.

In step S104, the overall control CPU 101 starts operations of the image capturing driver 41 for the moving image mode, and then exits from the present subroutine.

In a case where the mode selected by the shooting mode switch 12 is the still image mode as a result of the determination in step S102, processing proceeds to step S106.

In step S106, the overall control CPU 101 reads out various types of settings for the still image mode from the built-in nonvolatile memory 102, stores them into the primary memory 103, and then proceeds to step S107. Here, the various types of settings for the still image mode include a setting value ang for the angle of view (which is preset to 45° in the present embodiment), and an anti-vibration level designated by "high", "medium", "off", etc.

In step S107, the overall control CPU 101 starts operations of the image capturing driver 41 for the still image mode, and then exits from the present subroutine.

In a case where the mode selected by the shooting mode switch 12 is the preset mode as a result of the determination in step S102, processing proceeds to step S108. Here, the preset mode is a mode in which an external device such as the display apparatus 800 sets a shooting mode with respect to the camera 1, and is one of the three shooting modes among which the shooting mode switch 12 can switch. Specifically, the preset mode is a mode for custom shooting. Here, as the camera 1 is a small wearable device, the camera 1 is not provided with operation switches, a setting screen, and the like for changing the detailed settings therefor, and the detailed settings for the camera 1 are changed using an external device such as the display apparatus 800.

For example, assume a case where an angle of view of 90° and an angle of view of 110° are desired to be shot continuously in the same moving image shooting. An angle of view of 90° is set in the normal moving image mode; therefore, in order to perform the aforementioned shooting, the following manipulation is required: first, perform shooting in the normal moving image mode, and thereafter, stop the shooting, and switch the display apparatus 800 to a setting screen for the camera 1 to change the angle of view to 110°. However, manipulating the display apparatus 800 is troublesome during some sort of event.

On the other hand, if the preset mode is set in advance as a mode that shoots moving images with an angle of view of 110°, simply sliding the shooting mode switch 12 to "Pri" after the shooting of moving images with an angle of view of 90° is ended can promptly switch to the shooting of moving images with an angle of view of 110°. That is to say, the user no longer needs to suspend the current action and perform the troublesome manipulation mentioned above.

Note that the contents set in the preset mode may include not only the angle of view, but also an anti-vibration level designated by "high", "medium", "off", etc., settings for voice recognition, and so forth.

In step S108, the overall control CPU 101 reads out various types of settings for the preset mode from the built-in nonvolatile memory 102, stores them into the primary memory 103, and then proceeds to step S109. Here, the various types of settings for the preset mode include a setting value ang for the angle of view, and an anti-vibration level designated by "high", "medium", "off", etc.

In step S109, the overall control CPU 101 starts operations of the image capturing driver 41 for the preset mode, and then exits from the present subroutine.

Next, binaural recording processing according to the present embodiment will be described. In the present embodiment, binaural recording is realized by obtaining sounds using the microphones 19L, 19R, 19NL, and 19NR. The following describes sound processing using the block diagram of FIG. 5.

Shooting processing is executed as a result of the user inputting an instruction to the camera 1 by manipulating a non-illustrated button or by using a voice command.

Once the shooting processing has been started, the overall control CPU 101 of FIG. 5 executes initialization processing for the sound processing unit 104. Various types of settings, A/D conversion units, an ALC unit, and a memory inside the sound processing unit 104 are sequentially initialized by accessing a register, thereby making a preparation for recording.

The sound processing unit 104 makes a preparation for obtaining signals from each microphone by turning on the powers of the microphones. Furthermore, once the initialization processing for the sound processing unit 104 has ended, recording processing is started next.

In the recording processing, the sound processing unit 104 executes gain adjustment and filter processing that uses, for example, a low-cut or high-cut filter, with respect to the obtained sound signals, and outputs the sound signals. The overall control CPU 101 stores and records the output sound data into one file together with moving images that have been shot.

Reproduction of the recorded moving images is performed on, for example, a smartphone or a personal computer which is the display apparatus shown in FIG. 6. A moving image file is held in the large-capacity nonvolatile memory 804, and the recorded moving image file and angle information are simultaneously read out at the time of reproduction. Thereafter, sounds are reproduced by a speaker of the display apparatus or a connected headset.

Figure 8:
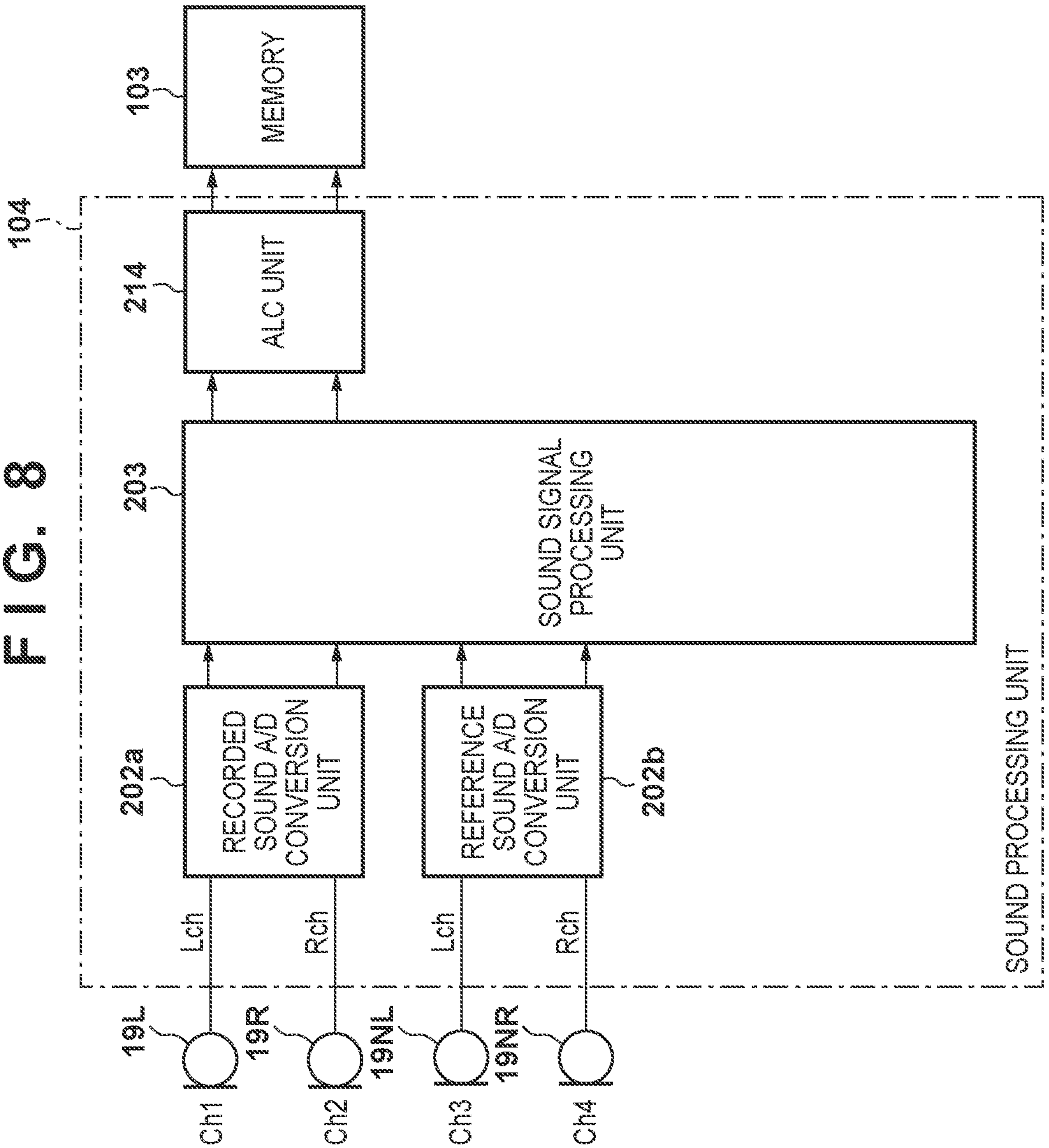
FIG. 8 is a block diagram showing a hardware configuration of a sound processing unit.

FIG. 8 is a block diagram showing a flow of signals, from execution of sound processing for signals obtained by the microphones 19L and 19R and storing of the signals into the primary memory 103.

Sound signals obtained by the microphone 19L and sound signals obtained by the microphone 19R, which are respectively regarded as left-channel (Lch) sound signals and right-channel (Rch) sound signals, are converted from analog signals to digital signals in a recorded sound A/D conversion unit 202*a*. A certain amount of gain is applied before the A/D conversion so as to achieve a desired level in accordance with microphone sensitivity and the level of recorded sound signals, and then the A/D conversion is performed. For example, a programmable-gain amplifier (PGA) can be used as means for applying a gain. Note that although there are a variety of A/D conversion methods, it is assumed that delta-sigma A/D conversion is used in the present embodiment.

Sound signals obtained by the microphone 19NL and sound signals obtained by the microphone 19NR, which are respectively regarded as Lch reference sound source signals and Rch reference sound source signals, are similarly converted from analog signals to digital signals in a reference sound A/D conversion unit 202*b*.

The sound signals obtained by the microphones 19L and 19R are used as sound sources for recording of sounds, whereas the sound signals obtained by the microphones 19NL and 19NR are used as reference sound signal for noise reduction processing.

A sound signal processing unit 203 applies noise reduction processing that uses reference sound signals to the sound signals that have been picked up. For example, sound signals Lch and Rch with reduced noise can be obtained by predicting noise, or extracting noise components, from the reference sound signals with use of the TMS method and subtracting the noise or noise components from sound signals for recording.

The sound signals with reduced noise are adjusted by an auto level control (ALC) unit 214 so that they have an appropriate sound volume, and stored into the primary memory 103. Sound signals that have been obtained at a predetermined sampling period and stored into the primary memory 103 are incorporated in a moving image file as sounds of recorded moving images during the continuation of recording of a moving image signal by the camera 1. The moving image file is stored into the large-capacity nonvolatile memory 51.

Execution of the above-described sound processing makes it possible to record sounds in which noise attributed to vibration propagated through the camera 1 has been reduced, and append sound data that can binaurally reproduced to a recording file.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-021867, filed Feb. 15, 2023, which is hereby incorporated by reference herein in its entirety.

What is claimed is:

1. An image capturing apparatus that can be worn by a user hung around a neck of the user, the image capturing apparatus comprising:

an annular member that surrounds the neck of the user when the image capturing apparatus is worn on the user;

an image capturing circuit;

a first microphone that is arranged in the annular member at a position on a right side of the user and obtains environmental sounds;

a second microphone that is arranged in the annular member at a position on a left side of the user and obtains environmental sounds;

a third microphone that is arranged in the annular member in the vicinity of the first microphone and obtains a noise due to vibration of the image capturing apparatus;

a fourth microphone that is arranged in the annular member in the vicinity of the second microphone and obtains a noise due to vibration of the image capturing apparatus; and a CPU;

a memory storing a program that, when executed by the CPU, causes the CPU to function as a sound processing unit configured to generate a right-channel sound signal and a left-channel sound signal by using a sound signal obtained by the first microphone and a sound signal obtained by the second microphone, the sound processing unit executing processing for reducing a noise in the right-channel sound signal and a noise in the left-channel sound signal by using a sound signal output from the third microphone and a sound signal output from the fourth microphone, wherein the first microphone and the second microphone are exposed to an outside of the annular member so as to be capable of obtaining environmental sounds, whereas the third microphone and the fourth microphone are covered in the annular member.

2. The image capturing apparatus according to claim 1, wherein the first microphone and the second microphone are covered in the annular member, and the annular member includes a first opening for exposing the first microphone to the outside, and a second opening for exposing the second microphone to the outside.

3. The image capturing apparatus according to claim 2, wherein the first opening and the second opening are located on an outer circumference of the annular member.

4. The image capturing apparatus according to claim 1, wherein the first microphone and the second microphone are arranged on an outer circumferential side in a cross-section of the annular member, whereas the third microphone and the fourth microphone are arranged on an inner circumferential side in the cross-section of the annular member.

5. The image capturing apparatus according to claim 1, wherein a distance between a sound hole of the first microphone and a sound hole of the third microphone is set to a distance smaller than a wavelength of a main component of a sound signal to be obtained.

6. The image capturing apparatus according to claim 1, wherein a distance between a sound hole of the second microphone and a sound hole of the fourth microphone is set to a distance smaller than a wavelength of a main component of a sound signal to be obtained.

7. The image capturing apparatus according to claim 1, wherein the sound processing unit performs a binaural recording processing using the sound signal obtained by the first microphone, the sound signal obtained by the second microphone, the sound signal output from the third microphone and the sound signal output from the fourth microphone.

* * * * *